(12) United States Patent
Merrill

(10) Patent No.: US 9,097,858 B2
(45) Date of Patent: Aug. 4, 2015

(54) RETARDER FILM COMBINATIONS WITH SPATIALLY SELECTIVE BIREFRINGENCE REDUCTION

(75) Inventor: William Ward Merrill, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 202 days.

(21) Appl. No.: 13/703,556

(22) PCT Filed: Jun. 29, 2011

(86) PCT No.: PCT/US2011/042364
§ 371 (c)(1),
(2), (4) Date: Dec. 11, 2012

(87) PCT Pub. No.: WO2012/003215
PCT Pub. Date: Jan. 5, 2012

(65) Prior Publication Data
US 2013/0094085 A1    Apr. 18, 2013

Related U.S. Application Data

(60) Provisional application No. 61/360,127, filed on Jun. 30, 2010.

(51) Int. Cl.
*G02B 5/30*      (2006.01)
*B42D 25/29*    (2014.01)
*B42D 25/391*  (2014.01)

(52) U.S. Cl.
CPC .............. *G02B 5/3083* (2013.01); *B42D 25/29* (2014.10); *B42D 25/391* (2014.10)

(58) Field of Classification Search
CPC ..... G02B 5/3083; B42D 25/29; B42D 25/391
USPC .................................................... 359/489.07
See application file for complete search history.

(56) References Cited

U.S. PATENT DOCUMENTS 4,417,948 A    11/1983    Mayne-Banton
4,551,819 A    11/1985    Michl
(Continued)

FOREIGN PATENT DOCUMENTS

EP    1900509    3/2008
GB    2420188    5/2006
(Continued)

OTHER PUBLICATIONS

Baba, "Patterned Optical Polarising Films Fabricated by Laser Writing on Stretched Silver Island Multilayers", Electronics Letters, Jul. 22, 1999, vol. 35, No. 15, pp. 1249-1251.
(Continued)

*Primary Examiner* — Frank Font
(74) *Attorney, Agent, or Firm* — Yufeng Dong; Gregory D. Allen

(57) ABSTRACT

Retarder film combinations generally include a retarder film connected to another optical component such that light transmitted by the retarder film can impinge on the optical component, the combination being configured to allow independent patterning of the retarder film and the optical component by selective birefringence reduction. The patterning can change a first light retardation to a third light retardation in a first zone without substantially changing optical characteristics of the optical component in the first zone. The optical component may be a second retarder film having a second light retardation, and the patterning may change the second light retardation to a fourth light retardation, without substantially changing the first light retardation, in a second zone. The optical component may also be a multilayer optical film, or a diffusely reflective optical film having a blended layer of first and second distinct phases.

33 Claims, 9 Drawing Sheets

(56) References Cited

U.S. PATENT DOCUMENTS

| | | |
|---|---|---|
| 4,568,632 A | 2/1986 | Blum |
| 4,822,451 A | 4/1989 | Ouderkirk |
| 4,864,537 A | 9/1989 | Michl |
| 4,879,176 A | 11/1989 | Ouderkirk |
| 4,902,378 A | 2/1990 | Ouderkirk |
| 5,023,859 A | 6/1991 | Eich |
| 5,103,337 A | 4/1992 | Schrenk |
| 5,217,794 A | 6/1993 | Schrenk |
| 5,234,729 A | 8/1993 | Wheatley |
| 5,251,197 A | 10/1993 | Leube |
| 5,302,259 A | 4/1994 | Birngruber |
| 5,316,900 A | 5/1994 | Tsujioka |
| 5,327,285 A | 7/1994 | Faris |
| 5,360,659 A | 11/1994 | Arends |
| 5,389,324 A | 2/1995 | Lewis |
| 5,486,949 A | 1/1996 | Schrenk |
| 5,633,123 A | 5/1997 | Hill |
| 5,757,016 A | 5/1998 | Dunn |
| 5,825,543 A | 10/1998 | Ouderkirk |
| 5,882,774 A | 3/1999 | Jonza |
| 6,045,894 A | 4/2000 | Jonza |
| 6,096,247 A | 8/2000 | Ulsh |
| 6,157,490 A | 12/2000 | Wheatley |
| 6,179,948 B1 | 1/2001 | Merrill |
| 6,207,260 B1 | 3/2001 | Wheatley |
| 6,256,435 B1 | 7/2001 | Albert |
| 6,288,842 B1 | 9/2001 | Florczak |
| 6,352,761 B1 | 3/2002 | Hebrink |
| 6,368,699 B1 | 4/2002 | Gilbert |
| 6,384,971 B1* | 5/2002 | Faris ................. 359/486.02 |
| 6,437,915 B2* | 8/2002 | Moseley et al. ........... 359/465 |
| 6,459,514 B2 | 10/2002 | Gilbert |
| 6,496,239 B2 | 12/2002 | Seiberle |
| 6,496,287 B1 | 12/2002 | Seiberle |
| 6,498,679 B2* | 12/2002 | Lee et al. ............. 359/489.11 |
| 6,531,230 B1 | 3/2003 | Weber |
| 6,590,707 B1 | 7/2003 | Weber |
| 6,628,877 B2 | 9/2003 | Dugan |
| 6,650,615 B1 | 11/2003 | Yamamoto |
| 6,673,275 B1 | 1/2004 | Allen |
| 6,673,425 B1 | 1/2004 | Hebrink |
| 6,783,349 B2 | 8/2004 | Neavin |
| 6,788,463 B2 | 9/2004 | Merrill |
| 6,830,713 B2 | 12/2004 | Hebrink |
| 6,888,612 B2 | 5/2005 | Faris |
| 6,939,499 B2 | 9/2005 | Merrill |
| 7,019,905 B2 | 3/2006 | Weber |
| 7,052,812 B1 | 5/2006 | Wang |
| 7,057,816 B1 | 6/2006 | Allen |
| 7,064,897 B2 | 6/2006 | Hebrink |
| 7,116,387 B2 | 10/2006 | Tsai |
| 7,187,396 B2 | 3/2007 | Carroll, Jr. |
| 7,223,515 B1 | 5/2007 | Wolk |
| 7,256,936 B2 | 8/2007 | Hebrink |
| 7,316,558 B2 | 1/2008 | Merrill |
| 7,339,736 B2* | 3/2008 | Trapani et al. .......... 359/487.02 |
| 7,604,381 B2 | 10/2009 | Hebrink |
| 2004/0164434 A1 | 8/2004 | Tabar |
| 2004/0263974 A1* | 12/2004 | McDonough et al. ........ 359/487 |
| 2006/0082702 A1 | 4/2006 | Jacobs |
| 2006/0204720 A1 | 9/2006 | Biernath |
| 2006/0257679 A1 | 11/2006 | Benson, Jr. |
| 2007/0047261 A1 | 3/2007 | Thompson |
| 2007/0065636 A1 | 3/2007 | Merrill |
| 2007/0281143 A1 | 12/2007 | Aylward |
| 2007/0298271 A1 | 12/2007 | Liu |
| 2008/0020186 A1 | 1/2008 | Hebrink |
| 2008/0098488 A1* | 4/2008 | Schadt et al. ................ 726/33 |
| 2008/0143926 A1 | 6/2008 | Amimori |
| 2008/0151166 A1* | 6/2008 | Takemoto ............... 349/118 |
| 2008/0197518 A1 | 8/2008 | Aylward |
| 2009/0159578 A1 | 6/2009 | Lin |
| 2009/0273836 A1 | 11/2009 | Yust |
| 2010/0119738 A1 | 5/2010 | Suzuki |
| 2011/0157698 A1* | 6/2011 | Yoshimi ................. 359/462 |
| 2011/0249331 A1 | 10/2011 | Klippstein |
| 2011/0249332 A1 | 10/2011 | Merrill |
| 2011/0249334 A1 | 10/2011 | Merrill |
| 2011/0255163 A1 | 10/2011 | Merrill |
| 2011/0255167 A1 | 10/2011 | Merrill |
| 2011/0286095 A1 | 11/2011 | Merrill |
| 2013/0094084 A1 | 4/2013 | Merrill |
| 2013/0094088 A1 | 4/2013 | Merrill |
| 2013/0095434 A1 | 4/2013 | Dunn |
| 2013/0095435 A1 | 4/2013 | Dunn |

FOREIGN PATENT DOCUMENTS

| | | |
|---|---|---|
| JP | 2000-242748 | 9/2000 |
| WO | WO 97/32224 | 9/1997 |
| WO | WO 98/21521 | 5/1998 |
| WO | WO 99/53242 | 10/1999 |
| WO | WO 00/07046 | 2/2000 |
| WO | WO 02/50583 | 6/2002 |
| WO | WO 03/006261 | 1/2003 |
| WO | WO 2004/003630 | 1/2004 |
| WO | WO 2004/004362 | 1/2004 |
| WO | WO 2006/117403 | 11/2006 |
| WO | WO 2007/084000 | 7/2007 |
| WO | WO 2007/117323 | 10/2007 |
| WO | WO 2008/144136 | 11/2008 |
| WO | WO 2008/144656 | 11/2008 |
| WO | WO 2009/116660 | 9/2009 |
| WO | WO 2010/075340 | 7/2010 |
| WO | WO 2010/075357 | 7/2010 |
| WO | WO 2010/075363 | 7/2010 |
| WO | WO 2010/075373 | 7/2010 |
| WO | WO 2010/075383 | 7/2010 |

OTHER PUBLICATIONS

Baba, "Patterned Submicrometer-Thick Optical Polarizing Films Using Stretched Silver Island Multilayers", Micro- and Nano-photonic Materials and Devices, Proceedings of SPIE, Jan. 20, 2000, vol. 3937, pp. 156-163.

Karman, "P-37: Increasing the Viewing Angle of Multidomain LCDs by Using Patterned Retarders", Eurodisplay, 2002, pp. 515-517.

Matharu, "Liquid Crystals for Holographic Optical Data Storage", Chemical Society Reviews, 2007, vol. 36, No. 12, pp. 1868-1880.

Moia, "New Colour Shifting Security Devices", Optical Security and Counterfeit Deterrence Techniques V, Proceedings of SPIE-IS&T Electronic Imaging, SPIE, Jun. 3, 2004, vol. 5310, pp. 312-320.

Ostroverkhova, "Organic Photorefractives: Mechanisms, Materials, and Applications", Chemical Reviews, Jul. 2004, vol. 104, No. 7, pp. 3267-3314.

Roosendaal, "8.1: Novel High Performance Transflective LCD with a Patterned Retarder", SID Symposium Digest of Technical Papers, May 2003, vol. 34, No. 1, pp. 78-81.

Shibaev, "Thermotropic liquid-crystalline polymers: 14.* Thermo-recording on liquid-crystalline polymers with the aid of a laser beam", Polymer Communications, Dec. 1983, vol. 24, pp. 364-365.

Stover, Optical Scattering: Measurement and Analysis, Second Edition, SPIE Optical Engineering Press, Bellingham, WA, (1995), Chapter 1, pp. 1-27.

Tsai, "Fabricating Polymeric Micro-retardation Arrays for Autostereoscopic Display System by $CO_2$ Laser Heat Processing Technology", Stereoscopic Displays and Virtual Reality Systems VII, Proceedings of SPIE, May 3, 2000, vol. 3957, pp. 142-152.

Tsai, "Fabricating Microretarders by $CO_2$ Laser Heating Process Technology", Opt. Eng., Nov. 2001, vol. 40, No. 11, pp. 2577-2581.

Van Der Zande, "14.2: Technologies Towards Patterned Optical Foils", SID Symposium Digest of Technical Papers, May 2003, vol. 34, No. 1, pp. 194-197.

Weber, "Giant Birefringent Optics in Multilayer Polymer Mirrors", Science, Mar. 31, 2000, vol. 287, pp. 2451-2456.

International Search Report for PCT/US2011/042364, 4 pages.

* cited by examiner

RETARDER FILM COMBINATIONS WITH SPATIALLY SELECTIVE BIREFRINGENCE REDUCTION

FIELD OF THE INVENTION

This invention relates generally to optical films, with particular application to optical films that are or that include retarder films, and associated articles, systems, and methods.

BACKGROUND

Retarder films, sometimes also referred to as retarder plates, are known. A retarder film is constructed such that when normally incident unpolarized light passes through the film, one linear polarization state is delayed or "retarded" relative to an orthogonal linear polarization state. Light of the delayed polarization state is said to be polarized along an in-plane axis of the film referred to as the "slow axis", and light of the other polarization state is said to be polarized along an orthogonal in-plane "fast axis". Retarder films are tailored to provide a desired amount of delay or "retardation", and the retardation may be measured or specified in terms of a fraction of a design wavelength of light. For example, a quarter-wave retarder causes light polarized along the slow axis to be one-fourth of a wavelength out of phase (and delayed) with respect to light polarized along the fast axis. Likewise, a half-wave retarder causes light polarized along the slow axis to be one-half of a wavelength out of phase (and delayed) with respect to light polarized along the fast axis. In these cases, the referenced "wavelength" may be a wavelength in the middle of the visible spectrum, e.g., 560 nm. Retardation may alternatively be measured in terms of the physical or optical distance that the wavefront of the delayed polarization lags behind the wavefront of the other polarization as light of the two polarization states emerge from the retarder film. (The optical distance is the physical distance multiplied by the applicable refractive index.) For the quarter-wave and half-wave examples just mentioned, the retardations are 120 nm (=560/4) and 280 nm (=560/2), respectively.

Some workers have recently proposed fabricating a micro-retardation array for autostereoscopic display systems by micro-patterning a stretched polymeric material. See e.g. "Fabricating Polymeric Micro-retardation Arrays for Autostereoscopic Display System by $CO_2$ Laser Heat Processing Technology" by Tsai et al. in Proceedings of SPIE 3957 (2000), pp. 142-152. In this work, a $CO_2$ laser is used to heat a stretched birefringent polymeric material in a stripe-wise pattern to release internal stress and erase the retardation of the treated area. The workers report inner bubbles under some processing conditions and a change in surface profile to a ruggedly grooved surface.

BRIEF SUMMARY

We have developed techniques of making patterned retarder optical bodies that utilize the principle of heat-induced spatially selective birefringence reduction and that allow for greater control or selectivity of the retardation over the useable area of the optical body. In exemplary embodiments, the enhanced control/selectivity is achieved by incorporating into the optical body (sometimes also referred to herein as a composite film) a combination of at least two patternable retarder films and at least one blocking layer between such films. This construction allows the optical body to be exposed to a first optical beam in a first zone of the optical body to preferentially reduce the retardation of a first retarder film rather than a second retarder film in the first zone, while also allowing the optical body to be exposed to a second optical beam in a second zone of the optical body to preferentially reduce the retardation of the second retarder film rather than the first retarder film in the second zone. Since the first and second retarder films are disposed in the optical body in a layered arrangement such that at least some light that passes through one retarder film also passes through the other retarder film, the overall retardation of the optical body at a particular location (e.g. zone) on the useable area is a combination of the retardations of the individual retarder films at that location. Thus, depending upon the amount of spatial overlap, if any, desired between the first and second treated zones, the optical body may be patterned to exhibit a first overall retardation in one location that includes the contributions of the original retardations of the individual first and second retarder films, and in another location exhibit a second overall retardation that includes the contribution of the original retardation of the first retarder film and a reduced retardation (which may be zero retardation) of the treated second film, and in still another location exhibit a third overall retardation that includes the contribution of the original retardation of the second retarder film and a reduced retardation of the treated first film, and in still another location exhibit a fourth overall retardation that includes the contribution of the reduced retardations of the treated first and second retarder films.

The present application therefore discloses, inter alia, a composite retarder film that includes a first retarder film, a second retarder film, and a first blocking layer. The first retarder film provides a first light retardation, and has a first absorption characteristic. The second retarder film provides a second light retardation, and has a second absorption characteristic. The first blocking layer may be disposed between the first and second retarder films, and is adapted to at least partially block light that comprises a write wavelength. The first absorption characteristic is suitable to, upon exposure to light comprising the write wavelength, absorptively heat the first retarder film by an amount sufficient to change the first light retardation to a third light retardation while maintaining a structural integrity of the first retarder film. The second absorption characteristic is suitable to, upon exposure to light comprising the write wavelength, absorptively heat the second retarder film by an amount sufficient to change the second light retardation to a fourth light retardation while maintaining a structural integrity of the second retarder film.

The first and second light retardations may be substantially the same, or substantially different. For example, the first light retardation may be a half-wave retardation, and the second light retardation may be a quarter-wave retardation. The third light retardation may be less than the first light retardation, and the fourth light retardation may be less than the second light retardation. The first retarder film may have a first fast axis, the second retarder film may have a second fast axis, and the first and second fast axes may be substantially parallel, or perpendicular, or otherwise oriented as desired. The first and second retarder films may be interior layers of the composite film or optical body. In some cases the composite film may further include a third retarder film providing a fifth light retardation, and a second blocking layer between the third retarder film and at least one of the first and second retarder films. The third retarder film may have a third absorption characteristic suitable to, upon exposure to light comprising the write wavelength, absorptively heat the third retarder film by an amount sufficient to change the fifth light retardation to a sixth light retardation while maintaining a structural integrity of the third retarder film. In exemplary embodiments, the various blocking layers and the absorptive characteristics of the various retarder films are adapted to allow the retardation of each retarder film to be changed substantially independently of the retardation of the other retarder films in the composite retarder film or body.

If the fast axes of the first and second retarder films are parallel, their retardations are additive. That is, the retardation of the composite film will include the sum of the retardations of the first and second films, and if the retardation of one of the individual films is reduced or eliminated by selective heat treatment, the retardation of the composite film will decrease. On the other hand, the fast axes of the first and second retarder films may be perpendicular, in which case their retardations are subtractive. That is, the retardation of the composite film will include the difference of the retardations of the first and second films, and if the retardation of one of the individual films is reduced or eliminated by selective heat treatment, the retardation of the composite film will increase. In some cases, the fast axes of the first and second retarder films may be oriented at an intermediate angle greater than 0 degrees and less than 90 degrees.

Related methods of making patterned retarder films are also disclosed. Such a method may include: providing a composite retarder film that includes a first film providing a first light retardation and a second film providing a second light retardation, the second film being disposed such that at least some light transmitted by the first film impinges upon the second film; directing a first beam of light at the composite retarder film to change the first light retardation to a third light retardation without substantially changing the second light retardation; and directing a second beam of light at the composite retarder film to change the second light retardation to a fourth light retardation without substantially changing the first light retardation.

The procedure of directing the first beam at the composite retarder film may selectively heat the first film in a first zone to cause the first light retardation to change to the third light retardation in the first zone, and the procedure of directing the second beam at the composite retarder film may selectively heat the second film in a second zone different from the first zone to cause the second light retardation to change to the fourth light retardation in the second zone. The first and second zones may partially overlap such that the composite film exhibits different first, second, and third film retardations in different portions of the first and second zones. The first beam of light may comprise a write wavelength and the second beam of light may also comprise the write wavelength, and the composite film may include a blocking layer that at least partially blocks light of the write wavelength. The first and second light retardations may be substantially the same, or substantially different. For example, the first light retardation may be a half-wave retardation, and the second light retardation may be a quarter-wave retardation. The third light retardation may be less than the first light retardation, and the fourth light retardation may be less than the second light retardation. At least one of the third and fourth light retardations may be a substantially zero retardation.

We have also developed techniques of making composite optical films or bodies that include in some layered arrangement a patternable retarder and a patternable optical film other than a retarder. The patternable retarder may for example be connected to the patternable optical film by simple lamination. The patternable retarder may itself have a composite construction, with two or more independently patternable retarder films as described above, or it may have a simple single retarder layer or film construction. Absorptive characteristics of the patternable retarder and patternable optical film are tailored so that these two components of the composite optical film or body can be independently processed or treated in different patterns using suitable optical radiation that can modify the patternable retarder in selected locations without substantially modifying the patternable optical film, and vice versa. The modifications may be chiefly associated with a reduced birefringence of one or more birefringent material within the pertinent layer using heat resulting from absorption of the optical radiation. In some cases the patternable optical film may be or comprise a patternable multilayer optical film having one or more packets of microlayers whose (specular) reflection characteristics are determined in large part by constructive and destructive interference of light reflected from interfaces between the microlayers, at least some of the microlayers being birefringent. In some cases the patternable optical film may be or comprise a patternable diffusely reflective film having a blended layer containing at least first and second materials separated into distinct first and second phases, at least one of the materials or phases being birefringent. In any case, the reflectivity (including the diffuse reflectivity and/or transmission) of the patternable optical film can be spatially modified according to a first desired pattern, and the retardation of the patternable retarder can be spatially modified according to a second desired pattern that may differ from, but that may be in at least partial registration with, the first pattern. Such a patterned optical film or body may be useful in applications where spatially non-uniform reflectivity and retardation are necessary or desirable, e.g., in certain display or security applications.

We also therefore disclose, for example, a composite film or body that includes in some layered arrangement a retarder film providing a first light retardation, and an optical film providing a first reflective characteristic. At least some light transmitted by the retarder film impinges upon the optical film. The retarder film may have a first absorption characteristic suitable to, upon exposure to a first light beam, absorptively heat the retarder film by an amount sufficient to change the first light retardation to a second light retardation without changing the first reflective characteristic of the optical film and while maintaining a structural integrity of the retarder film. The optical film may have a second absorption characteristic suitable to, upon exposure to a second light beam, absorptively heat the optical film by an amount sufficient to change the first reflective characteristic to a second reflective characteristic without changing the first light retardation of the retarder film.

The second absorption characteristic may be suitable to, upon exposure to the second light beam, absorptively heat the optical film by an amount sufficient to change the first reflective characteristic to the second reflective characteristic while maintaining a structural integrity of the optical film. The optical film may include a first group of microlayers arranged to selectively reflect light by constructive or destructive interference to provide the first reflective characteristic, and the first group of microlayers may be interior to the composite film. The optical film may instead include a blended layer having at least a first and second material arranged in distinct first and second phases in the blended layer. At least one of the first and second phases may be a continuous phase that is birefringent. In some cases the optical film and the retarder film may be components of a coextruded polymeric film. For example, the first retarder layer may be an interior layer or a skin layer of the coextruded polymeric film.

We also disclose methods of making patterned films. Such a method may include: providing a composite film that includes in some layered arrangement an optical film and a retarder film, the optical film providing a first reflective characteristic, and the retarder film providing a first light retardation; directing a first beam of light at the composite film to change the first reflective characteristic to a different second reflective characteristic in a first zone without substantially changing the first light retardation in the first zone; and directing a second beam of light at the film to change the first light retardation to a different second light retardation in a second zone without substantially changing the first reflective characteristic in the second zone.

Providing the composite film may include coextruding a first and second polymer material. The optical film may include a first group of microlayers arranged to selectively reflect light by constructive or destructive interference to provide the first reflective characteristic. In some cases, the retarder film may be an interior layer or a skin layer of the composite film, while in other cases the retarder film may be an internal layer of the composite film. In some cases the optical film may include a blended layer having at least a first and second material arranged in distinct first and second phases in the blended layer, and the first reflective characteristic may be a first diffusely reflective characteristic.

At least some of the disclosed techniques may be referred to as bi-level patterning, because an optical characteristic of at least one layer or portion (e.g., a retarder film) of a composite film can be selectively modified in one area or zone, and a different optical characteristic of a different layer or portion (e.g., another retarder film, or a multilayer optical film, or a diffusely reflective film) of the composite film can be selectively and independently modified in a different area or zone of the composite film. The modification of the optical characteristic of a given layer or portion of the composite film is preferably accomplished by reducing or eliminating a birefringence of a material within such layer or portion by selective heating. The heating can be provided at least in part by directing a beam of light at the composite film, the beam of light comprising a write wavelength at which at least one of the materials within the given layer or portion of the composite film is absorptive. In the x- and y- (in-plane) directions, the heating can be patternwise applied to selected in-plane areas or zones of the composite film by shaping the light beam as appropriate so that only the selected in-plane areas or zones are exposed to the light. In the z- (thickness) direction, the heating can be applied to different selected interior portions of the composite film by suitable design of the composite film, in combination with suitable delivery characteristics of the directed light beam, as described further below. In at least some cases, the internal patterning can be accomplished without any selective application of pressure to the composite film, and without any significant thinning of the composite film.

The absorptive characteristics of the constituent films and layers that allow the bi-level patterning can be tailored by incorporating a suitable absorbing agent into one or more of the materials used in the construction of the composite film, and/or by relying on the natural or inherent absorptivity of one or more such materials. Preferably, the absorptivity (whether natural or aided by an absorbing agent) of each constituent film and layer of the composite film is substantially spatially uniform in the plane of the film so that the film can be processed or treated at any desired location or zone over the useable area of the composite film.

In cases where a blocking layer is used, it may also be a STOF film, i.e., its reflective characteristics may be modified by the application of a suitable radiant beam by the mechanism of heat-induced birefringence reduction. In such cases, after the blocking layer is used to isolate one constituent film from another in the composite construction during patterning, the blocking layer may itself be treated with another suitable radiant beam over a portion of its useable area or over its entire useable area so as to reduce or minimize the amount of birefringence or retardation that the blocking layer contributes to the composite construction in its final form.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

In at least some disclosed embodiments, the bi-level patterning techniques discussed herein can make use of patterning techniques that do not rely on a selective thinning of the film to accomplish the patterning. For example, the bi-level internal patterning may utilize internal patterning techniques in which a composite optical film is selectively heated in at least one zone by exposing the film to suitable directed radiation, without any selective application of pressure, in such a way that birefringence of at least one material within the film is reduced or eliminated in the selected zone but not in a neighboring zone, while substantially maintaining the physical integrity of the film in the selected (treated) zone, so as to change an optical characteristic of the film (e.g. an optical retardation or a reflective characteristic) in the selected zone relative to the neighboring zone. The various treated and untreated zones of the film may have substantially the same overall film thickness, or at any rate the difference in optical characteristics between the different zones may not be substantially attributable to any differences in film thickness between the zones. Furthermore, any difference in optical characteristics between the different zones is preferably not substantially attributable to any differences in surface texture, roughness, or other surface effects of the film. Reference is made to PCT Publication WO 2010/075357 (Merrill et al.), "Internally Patterned Multilayer Optical Films Using Spatially Selective Birefringence Reduction", and U.S. Application Ser. No. 61/360,124, "Diffuse Reflective Optical Films With Spatially Selective Birefringence Reduction", filed Jun. 30, 2010.

Figure 1:
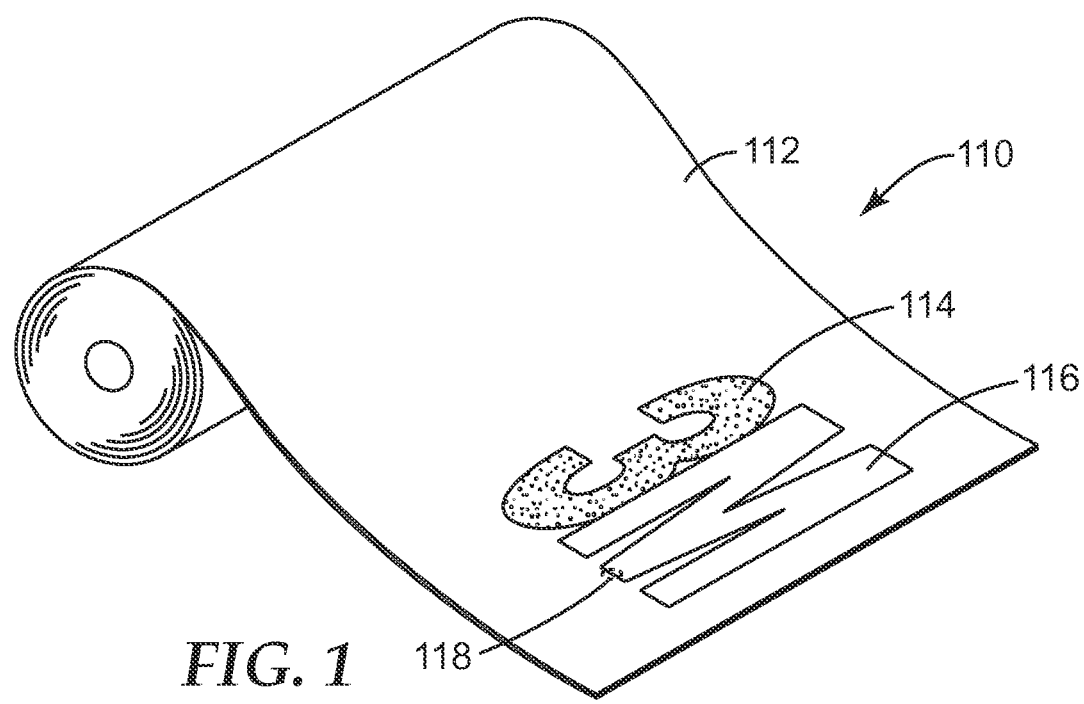
FIG. 1 is a perspective view of a roll of composite optical film that has been patterned independently in multiple levels thereof to provide different optical characteristics in different portions or zones of the composite film so as to form bi-level indicia.

FIG. 1 depicts a composite optical film 110 that has been patterned or spatially tailored using spatially selective birefringence reduction of at least some of the constituent films or layers (not shown in FIG. 1) of the composite film 110. The bi-level patterning defines distinct zones 112, 114, 116 that are shaped so as to form the indicia "3M" as shown, although any other patterns, whether regular or irregular, repeating or non-repeating, can be produced. The film 110 is shown as a long flexible material wound into a roll because the methodology described herein is advantageously compatible with high volume roll-to-roll processes. However, the methodology is not limited to flexible roll goods and can be practiced on small piece parts or samples as well as non-flexible films and articles.

The "3M" indicia is detectable, either to the unaided eye or with the assistance of other optical components or devices, because the different zones 112, 114, 116 have different optical characteristics. In the depicted embodiment, zone 112 has a first composite optical characteristic, zone 114 has a second composite optical characteristic different from the first composite characteristic, and zone 116 has a third composite optical characteristic different from both the first and second composite characteristics. At any specified location or zone on the film 110, these "composite optical characteristics" are made up of the optical characteristics of the constituent components of the composite film 110, such as distinct layers or films, the combination of which then provide the overall optical characteristic of the composite film itself, i.e., the "composite optical characteristic", at the specified location or zone.

For example, the first composite optical characteristic, in zone 112, may be a combination of a first retardation of a first retarder film and a second retardation of a second retarder film. In such a case, the second composite optical characteristic of zone 114 may then be a combination of a (modified) third retardation of the first retarder film and the (unmodified) second retardation of the second retarder film, while the third composite optical characteristic of zone 116 may be a combination of the (unmodified) first retardation of the first retarder film and a (modified) fourth retardation of the second retarder film. Alternatively, the second composite optical characteristic of zone 114 may be a combination of the (modified) third retardation of the first retarder film and the (unmodified) second retardation of the second retarder film, while the third composite optical characteristic of zone 116 may be a combination of the (modified) third retardation of the first retarder film and the (modified) fourth retardation of the second retarder film. In still another alternative, the second composite optical characteristic of zone 114 may be a combination of the (modified) third retardation of the first retarder film and the (modified) fourth retardation of the second retarder film, while the third composite optical characteristic of zone 116 may be a combination of the (unmodified) first retardation of the first retarder film and the (modified) fourth retardation of the second retarder film.

In some cases, the composite film 110 may provide only a patterned retardation with little or no reflectivity or absorption over the visible spectrum. In such a case the film 110 may appear to be a substantially uniform (unpatterned) window film to the unaided eye of a human observer. The patterned retardation may however be made visible to such observer by placing the film 110 between crossed polarizers, for example. Note that reflectivity and/or absorption may be provided by one or more blocking layers at wavelengths outside of the visible spectrum, e.g., at infrared wavelengths.

In other cases, the composite film 110 may provide both patterned retardation and patterned reflectivity over the visible spectrum. In such a case the patterned reflectivity of the film 110 would typically be noticeable to the unaided eye of a human observer, as long as the reflectivity is at least partially in the visible region of the spectrum. The retardation pattern may differ from the reflectivity pattern but may be in partial registration with it, e.g., if high reflectivity is provided in a regular grid of discrete zones, and a high or low retardation may be provided in a smaller number of zones that are in registration with only some of the high reflectivity zones. The reflectivity may be specular in nature, e.g., as provided by a multilayer optical film having packets of generally planar microlayers, or it may be diffuse in nature, e.g. as provided by a blended layer having at least a first and second material arranged in distinct first and second phases in the blended layer. The reflectivity may also depend on polarization state of the light.

In some cases, the film 110 may be at least partially light transmissive. In such cases, and where the film 110 has different reflectivities in its zones 112, 114, 116, those zones will also have different transmissive characteristics that correspond to their respective reflective characteristics. In general, of course, transmission (T) plus reflection (R) plus absorption (A)=100%, or T+R+A=100%. When dealing with films that may appreciably diffusely scatter the transmitted and/or reflected light, we keep in mind that T may represent the hemispheric transmission, i.e., all light that exits the film on a side of the film opposite the light source, regardless of its propagation direction within a solid angle of $2\pi$, and R may likewise represent the hemispheric reflection, i.e., all light that exits the film on the same side of the film as the light source, regardless of its propagation direction within a complementary $2\pi$ solid angle. In some embodiments the film is composed entirely of materials that have low absorption over at least a portion of the wavelength spectrum. This may be the case even for films that incorporate an absorbing dye or pigment to promote heat delivery, since some absorbing materials are wavelength specific in their absorptivity. For example, infrared dyes are available that selectively absorb in the near-infrared wavelength region but that have very little absorption in the visible spectrum. At the other end of the spectrum, many polymer materials that are considered to be low loss in the optical film literature do have low loss over the visible spectrum but also have significant absorption at certain ultraviolet wavelengths. Thus, in many cases the film 110 may have an absorption that is small or negligible over at least a limited portion of the wavelength spectrum, such as the visible spectrum, in which case the reflection and transmission over that limited range take on a complementary relationship because T+R=100%−A, and since A is small, $$T+R \approx 100\%.$$

As mentioned elsewhere herein, the different optical characteristics of the composite film (e.g. film 110) in the different patterned zones (e.g. zones 112, 114, 116) are each the result of structural features (such as a stack of microlayers in a multilayer optical film, or distinct first and second phases in a blended layer) or bulk material (such as the birefringent material volume disposed between the opposed outer surfaces of a birefringent retarder film) that are or is internal to the composite film, rather than the result of coatings applied to the surface of the film or other surface features. This aspect of the disclosed films makes them advantageous for security applications (e.g. where the film is intended for application to a product, package, or document as an indicator of authenticity) because the interior features are difficult to copy or counterfeit.

The first, second, and third composite optical characteristics differ from each other in some way that is perceptible under at least some viewing conditions to permit detection of the pattern by an observer or by a machine. In some cases it may be desirable to maximize the difference between the various composite optical characteristics at visible wavelengths so that the pattern is conspicuous to human observers under most viewing and lighting conditions. In other cases it may be desirable to provide only a subtle difference between the various film reflective characteristics, or to provide a difference that is conspicuous only under certain viewing conditions. In either case the differences between the first, second, and third composite optical characteristics are preferably attributable primarily to differences in the refractive index properties of interior features of the optical film in the different neighboring zones of the film, and are not primarily attributable to differences in thickness between the neighboring zones, nor to surface-related features.

The zone-to-zone differences in refractive index can produce various differences in optical characteristics (retardation optionally in combination with diffuse and/or specular reflectivity, whether of the entire film and/or a portion of its constituent interior layers) depending on the design of the composite film. For example, in some cases, the first, second, and third composite optical characteristics correspond to different amounts of retardation of the composite film.

In embodiments that include a diffusely reflective blended layer, the first composite optical characteristic may be or include, for example, a minimum, maximum, or average diffuse reflectivity (or transmission) value over the visible wavelength range, where the reflectivity (or transmission) may be measured for an incident beam of a specified polarization state and for reflected (or transmitted) light within a specified solid angle of reflected (or transmitted) directions relative to the incident beam, or within a hemispheric (2π) solid angle on the incident light-side (or the opposite side) of the film, for example. The second composite optical characteristic may differ from the first by having a substantially different (whether greater or lesser) minimum, maximum, or average reflectivity or transmission value for the same specified incident light and measurement conditions as the first characteristic. Furthermore, one of the first and second composite optical characteristics may correspond substantially to a highly transmissive, low scattering appearance as in the case of a window film, at least for incident light of one polarization state.

In embodiments that include a specularly reflective multilayer optical film comprising a packet of microlayers, a first optical characteristic (whether of the entire composite film and/or one of its constituent elements) may include a first reflection band with a given center wavelength, band edge, and maximum reflectivity, and a second optical characteristic (whether of the entire composite film and/or one of its constituent elements) may differ from the first by having a second reflection band that is similar in center wavelength and/or band edge to the first reflection band, but that has a substantially different maximum reflectivity (whether greater or lesser) than the first reflection band, or the second reflection band may be substantially absent from the second optical characteristic. These first and second reflection bands may be associated with light of only one polarization state, or with light of any polarization state depending on the design of the film.

Thus, for example, a first reflective characteristic (which may be diffuse or specular in nature), in zone 112, may have a peak or average reflectivity of $R_1$ in a wavelength range of interest for a specified condition of incident light (e.g. a specified direction, polarization, and wavelength, such as normally incident unpolarized visible light, or normally incident visible light polarized along a particular in-plane direction). The reduced birefringence in the zones 114, 116 may yield a second reflective characteristic (which may again be diffuse or specular in nature), such as a different peak or average reflectivity of $R_2$ in the same wavelength range of interest for the same specified condition of incident light. $R_1$ and $R_2$ are compared under the same illumination and observation conditions, for example, $R_1$ and $R_2$ may be measured as hemispheric reflectivity on the incident light-side of the film, for the specified incident condition. If $R_1$ and $R_2$ are expressed in percentages, $R_2$ may differ from $R_1$ by at least 10%, or by at least 20%, or by at least 30%. As a clarifying example, $R_1$ may be 70%, and $R_2$ may be 60%, 50%, 40%, or less. Alternatively, $R_1$ may be 10%, and $R_2$ may be 20%, 30%, 40%, or more. $R_1$ and $R_2$ may also be compared by taking their ratio. For example, $R_2/R_1$ or its reciprocal may be at least 2, or at least 3.

In some cases the first and second optical characteristics may differ in their dependence of reflectivity with viewing angle. For example, the first optical characteristic may include a first reflection band that has a given center wavelength, band edge, and maximum reflectivity at normal incidence, and the second optical characteristic may include a second reflection band that is very similar to these aspects of the first reflection band at normal incidence. With increasing incidence angle, however, although both the first and second reflection bands may shift to shorter wavelengths, their respective maximum reflectivities may deviate from each other greatly. For example, the maximum reflectivity of the first reflection band may remain constant or increase with increasing incidence angle, while the maximum reflectivity of the second reflection band, or at least the p-polarized component thereof, may decrease with increasing incidence angle, e.g. in a range from normal incidence to the Brewster's angle.

In embodiments that include at least one multilayer optical film, the differences discussed above between the first and second optical characteristics may relate to reflection bands that cover a portion of the visible spectrum. Such differences may in those cases be perceived as differences in color between the different in-plane zones of the film.

A first reflective characteristic may have a given minimum, maximum, or average reflectivity or transmission for light of a given polarization state normally incident on the film, and a second reflective characteristic may have the same or similar reflectivity or transmission value for light of the same incidence conditions. With increasing incidence angle, however, the value may increase for the first characteristic and decrease for the second characteristic, or vice versa, or the value may remain relatively constant for one characteristic and substantially increase or decrease for the other. In embodiments that include at least one diffusely reflective blended layer, different first and second diffusely reflective characteristics may exhibit the same or similar average reflectivity over visible wavelengths for normally incident light of a given polarization state, but as the incidence angle increases, the average reflectivity of the film in a first zone (corresponding to the first diffusely reflective characteristic) may increase, while the average reflectivity of the film in a second zone (corresponding to the second diffusely reflective characteristic) may decrease.

Figure 2:
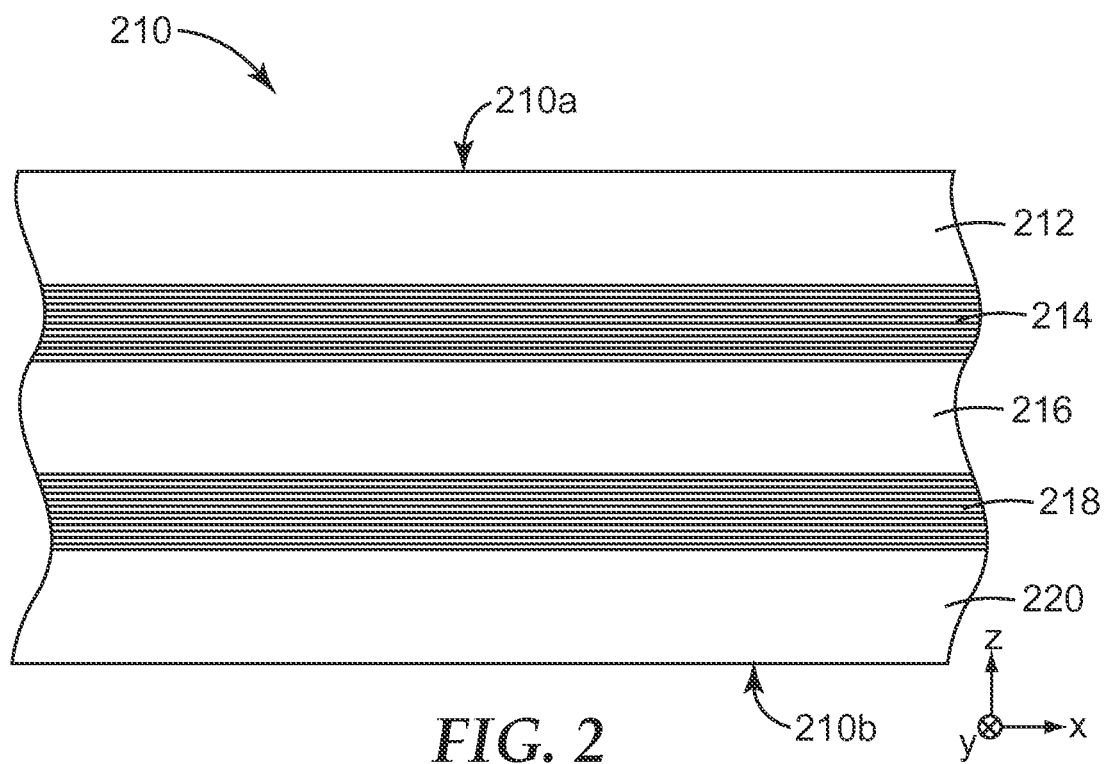
FIG. 2 is a schematic side or sectional view of a portion of a composite film that includes three functional layers or films and two blocking layers.

FIG. 2 is a schematic side or sectional view of a portion of a composite film 210 that includes a first, second, and third functional layer or film 212, 216, 220 and a first and second blocking layer 214, 218. These components are connected to each other in a layered arrangement by any suitable means, e.g., by lamination, coextrusion, and/or other known techniques, to produce the composite film 210 as shown. The composite film 210 typically has a relatively limited thickness in the z-direction, and typically extends along in-plane x- and y-directions. Spatial patterning of the film 210 is then defined generally along the x-y plane, but one patterning operation can be carried out selectively on one constituent layer or film using one light beam, and a different patterning operation can be carried out selectively on a different constituent layer or film using a different light beam. This selective patterning is made possible by appropriate selection of the absorptive characteristics of the functional layers, appropriate selection of the blocking layers, and appropriate selection of the light beams used to carry out the different patterning operations. The optical characteristics of the differently patterned layers or films within the composite film then combine at each (x,y) position over the useable area of the composite film to define the spatially non-uniform optical characteristics of the composite film.

The composite film 210 has a front or top surface 210a and a back or bottom surface 210b as shown. In a simplified embodiment, the third functional layer 220 and the second blocking layer 218 of the composite film 210 may be omitted.

Initially, we will assume that all of the functional layers 212, 216, 220 are retarder films. In order to carry out bi-level patterning of the composite film 210, a first radiant energy beam impinges on the top surface 210a. This radiant energy may be polarized or collimated or both, e.g. from a laser source. The radiant energy comprises a write wavelength, e.g., a wavelength bandwidth. The radiant energy may be generated by a laser source, but non-laser sources may also be used. The absorptive characteristics of the retarder films 212, 216, 220, in combination with the respective materials selected for use in each of these films, can be tailored to make them progressively more sensitive to treatment caused by absorption of a portion of the incident radiant energy. That is, birefringence in film 220 may be thermally relaxed with a lower local intensity of radiant energy than is needed for film 216, and birefringence in film 216 may be thermally relaxed with a lower local intensity than is needed for film 212. Blocking layers 214, 218, which may e.g. be infrared reflecting multilayer optical mirror films or polarizing films, at least partially reduce the intensity of the radiant energy that would otherwise be transmitted to the layers and films beneath them from the perspective of top surface 210a. For example, blocking layer 214 and/or 218 can be a multilayer reflective polarizer, or it or they can be a multilayer mirror film that provides high reflectivity at normal incidence for the write wavelength, and low reflectivity and high transmission at a given oblique angle of incidence for the write wavelength. When two blocking layers are used, one may be a reflective polarizer and the other may be a band-shifting mirror.

In order to individually treat, i.e. selectively pattern, the first retarder film 212, the source intensity, scan speed (or dwell time), polarization, and incident angle onto the top surface 210a are controlled to provide a first radiant beam for which a sufficient radiant intensity is present in film 212 to locally relax its birefringence within the limited area or zone occupied by the first beam, while insufficient radiant intensity (below the threshold necessary for birefringence reduction) is transmitted through the respective blocking layers to the underlying films 216, 220. In order to individually treat the second retarder film 216, the source intensity, scan speed (dwell time), polarization, and incident angle onto the top surface 210a are controlled to provide a second radiant beam for which: (a) insufficient radiant intensity (below the threshold necessary for birefringent reduction) is present in the first retarder film 212; (b) sufficient radiant intensity is present in the second retarder film 216 to reduce birefringence in that film (which is more sensitive to treatment than the first film 212) within a limited area or zone occupied by the second beam; and (c) insufficient radiant intensity (below the threshold necessary for birefringence reduction) is transmitted through the blocking layer 218 to the underlying film 220. Finally, to individually treat the third retarder film 220, the source intensity, scan speed (dwell time), polarization, and incident angle onto the top surface 210a are controlled to provide a third radiant beam for which: (a) insufficient radiant intensity (below the threshold necessary for birefringent reduction) is present in the films 212, 216; and (b) sufficient radiant intensity passes through films 212, 216 and blocking layers 214, 218 to reach film 220, thus reducing birefringence in film 220 (which is more sensitive to treatment than the films 212, 216) within a limited area or zone occupied by the third beam.

In a simpler example, consider the embodiment of FIG. 2 but with film 220 and blocking layer 218 omitted. In this simpler embodiment, one of the retarder films 212, 216 may be a quarter-wave retarder, and the other film may be a half-wave retarder. The composite film formed by films 212, 216 and layer 214 is then a spatially uniform three-quarter wave film, provided the fast axes of the films 212, 216 are parallel to each other, and provided layer 214 does not introduce any significant in-plane retardation. This spatially uniform composite retarder film can then be bi-level patterned to provide different amounts of retardation at different positions or zones on the useable area. The quarter-wave retarder film may for example be selectively heat treated in a first zone, e.g. with a first radiant beam, to substantially eliminate the birefringence of the quarter-wave film material and thus reduce the retardation from quarter-wave to substantially zero. The composite film then becomes a half-wave film in that first zone. The individual half-wave retarder film may be selectively heat treated in a second zone that does not overlap with the first zone, e.g. with a second radiant beam, to substantially eliminate the birefringence of the half-wave film material and thus reduce the retardation from half-wave to substantially zero. The composite film then becomes a quarter-wave plate in the second zone. If the first and second treated zones overlap, then in the area of overlap, the composite film has zero total retardation. In this manner, the patterned composite film may provide a total retardation of three-quarter waves in one location or zone (in which neither retarder film has been heat treated), one-half wave in another location or zone (in which only the quarter-wave retarder film has been heat treated), one-quarter wave in yet another location or zone (in which only the half-wave retarder film has been treated), and zero retardation in yet another location or zone (in which both the half-wave retarder film and the quarter-wave retarder film has been treated). If such a composite film is then illuminated with low intensity linearly polarized light, appropriately oriented with respect to the fast axis of the composite film, then four different states of polarized light will exit the composite film at the different locations or zones: two orthogonal linear polarization states, and two orthogonal circularly polarized states.

Note that in order to obtain reasonably uniform broad-band retardation over a wavelength range of interest such as the visible wavelength range, any or all of the retarder films 212, 216, 220 may themselves be combinations of two or more birefringent layers or films.

Additional retarders and/or other layers, coatings, or films (see e.g. U.S. Pat. No. 6,368,699 (Gilbert et al.)) can be attached to the top or bottom layers in a composite film construction, or elsewhere in the construction. Additional retarders that are selectively heat-treatable as discussed herein, or that are not heat-treatable, may also be added within the embodiment of FIG. 2, e.g., juxtaposed between the various layers, to achieve additional desired effects. Furthermore, one or more of retarder films 212, 216, 220 may be replaced with a combination of heat-treatable layers, which combination may then be pattern-wise heat-processed simultaneously as a grouping of layers. In some cases, a given retarder film can be a skin layer or optically thick internal layer of a multilayer optical film, which multilayer optical film may be for example a reflective polarizer or mirror. The multilayer optical film may also have suitable absorptive characteristics such that it can be a spatially tailored optical film (STOF). Reflective films and retarder films can be individually heat treated and separately patterned with different radiant beams, e.g. by using absorbing agents that absorb at different wavelengths, or they can be heat treated in a combined process.

In other embodiments, at least one of the patternable retarder films of FIG. 2 may be retained, and at least another of the patternable retarder films may be replaced with a patternable reflective film or STOF. The patternable reflective film may be or comprise a multilayer optical film having one or more packets of microlayers whose (specular) reflection characteristics are determined in large part by constructive and destructive interference of light reflected from interfaces between the microlayers, at least some of the microlayers being birefringent. In some cases the patternable reflective film may be or comprise a patternable diffusely reflective film having a blended layer containing at least first and second materials separated into distinct first and second phases, at least one of the materials or phases being birefringent. In any case, the reflectivity (including the diffuse reflectivity and/or transmission) of the patternable reflective film can be spatially modified according to a first desired pattern, and the retardation of the patternable retarder can be spatially modified according to a second desired pattern that may differ from, but that may be in at least partial registration with, the first pattern. Thus, the reflective properties of the reflective film or STOF may be altered essentially independently of the level of retardation in the retarder film and vice-versa.

One or more of the blocking layers may themselves be birefringent, in which case they may also impart significant retardation to the construction. This additional retardation, if significant, should also be considered in the design of the bi-level patternable composite films. It may be advantageous to use an equally biaxially stretched mirror film with very low or zero in-plane retardation for a normal-incidence blocking layer. Retardation from each of the blocking layers may also be cancelled by adding identical birefringent layers to the composite film (e.g. at the back thereof) but rotated 90 degrees relative to the respective blocking layers. When a polarized blocking layer is used, again an identical film can be placed at the back of the composite film to cancel the added retardation. When it is desirable to combine both the off-normal and polarized capabilities in a single stack of retarder plates, e.g. for three separately addressable layers, then it may be advantageous to use two identical polarizers for two of the blocking layers (e.g. 214 and 218 in FIG. 2), but orienting them 90 degrees apart, i.e., in a crossed configuration. Off-normal processing may then be used to circumvent the crossed polarizer construction in front of the deepest retardation plate (220 in FIG. 2) from the radiant energy treatment source.

Since the disclosed bi-level patternable composite films may be incorporated into a device such as a display device, it is often advantageous for the blocking layer(s) to exhibit relatively high transmission of light within a wavelength range used in the device under normal operating conditions. For example, if the device displays images using visible light, e.g. light in a wavelength range from 400-700 nm, then the radiant energy beam(s) used for patterning, and any reflection bands of any blocking layers, preferably lie outside this wavelength range. Moreover, any reflection bands of any blocking layers preferably do not shift into this wavelength range at oblique angles of incidence used by the device. Thus, in device applications that use more highly collimated light, the composite film may utilize one or more blocking layers having left band edges (i.e., the short wavelength edge of a reflection band) that are relatively close to the visible wavelength range. When the blocking layer is a multilayer optical film, the higher order reflections are also preferentially suppressed in the wavelength range used by the device. In some cases, such as when the radiant energy beam used for patterning the composite film is in the ultraviolet wavelength range, the blocking layer(s) may block light of a shorter wavelength than that used in the optical device, in which case higher order reflections of a multilayer optical film-based blocking layer are not a concern.

As mentioned above, the blocking layer may also be a STOF film, i.e., it may have suitable absorptive characteristics such that its reflective characteristics may be modified by the application of a suitable radiant beam by the mechanism of heat-induced birefringence reduction. In such cases, after the blocking layer is used to isolate one constituent film from another in the composite construction during patterning, the blocking layer may itself be treated with another suitable radiant beam over a portion of its useable area or over its entire useable area so as to reduce or minimize the amount of birefringence or retardation that the blocking layer contributes to the composite construction in its final form.

The disclosed composite films, and/or constituent films or layers thereof, can be heat-set or otherwise post-treated after film manufacture to improve dimensional stability. To improve dimensional stability, the film may be laminated to a glass plate. The plate may be part of a display, e.g. a Liquid Crystal Display (LCD), or an OLED display. The film may be adhered or otherwise attached to another component layer of the display, or may be used as a substrate for deposition of various display components. In some cases, the film may be laminated or otherwise adhered to the glass or display before radiant energy treatment, and furthermore, treated with radiant energy after lamination. The film can be heat treated again to stabilize the adherence to the glass and final dimensions, e.g. the film can be deliberately shrunk, or creep processes can be activated to ensure dimensional stability under conditions needed for further processing of the overall display system. In this manner, registration can be achieved on the local and global scale, e.g. with display pixels in a display device. In some cases, the display components may be insensitive to the radiant energy, and the composite film may be pattern-wise heat treated after attachment to the display without additional considerations. In other cases, the display components may be considered to be the final layer 220 of FIG. 2. In such a case, blocking layer 218 may then protect the display components from the effects of the radiant treatment. In a further variation (not illustrated), an additional protective blocking layer may be attached to the composite film 210 of FIG. 2 at surface 210b, and display elements may then be provided below or beneath that additional blocking layer. For example, such an additional blocking layer may be a mirror that prevents transmission of obliquely propagating radiant energy, e.g. used to process layer 220. In this manner, three functional layers 212, 216, and 220 are individually treatable with different radiant beams, and the underlying components are protected from damage. Finally, the composite film may also be mounted to a glass substrate at a front or top surface (e.g. 210a of FIG. 2), i.e., inside a display assembly. Such a configuration can help reduce parallax issues by minimizing the distance between the composite film and the other display elements.

In general, a system comprising, first, a radiant energy treatable or patternable layer, second, a layer that blocks this radiant energy while passing light of interest from the optical device or graphical display, and third, the optical device or graphical display itself, is also contemplated here. In this manner, the optical device or graphical display can be patterned using the radiant energy after assembly without concern for damage of the optical device by the patterning process. The optical device or graphical display may be active or passive.

In one example, a STOF mirror can be used in a transflective display. Portions of the patternable mirror film can be made more transparent by pattern-wise radiant beam treatment. In addition, portions of a retarder film covering the more reflective and/or more transparent areas of the mirror film can be treated independently to remove or reduce retardation at selected locations, e.g. reducing half-wave retardation to zero retardation. A composite film composed of the patternable mirror film and retarder film may be a useful component in a 3D transflective display.

Potential applications of the disclosed bi-level patternable composite films include graphical displays and optical devices. See, e.g., B. M. I. van der Zande et. al, *SID Symposium Digest of Technical Papers*, (2003), pp. 194-197. Patterned retarders have been used to improve brightness and contrast in reflective and transflective displays, viewing angles in transmissive displays, and to form 3D graphical displays. See, e.g.: S. J. Roosendaal et al., *SID Symposium Digest of Technical Papers*, (2003), pp 78-81; Karman, et al., Proc. Eurodisplay, (2002) p. 515; C. H. Tsai et al. *Proc. of SPIE*, Vol. 3957 (2000) p. 142; UK Patent GB 2,420,188 (Fukaishi et al.); U.S. Patent Application Publication US 2006/0082702 (Jacobs et al.); PCT publication WO 2004/004362 (Jacobs et al.); PCT publication WO 2004/003630 (Jacobs et al.); and U.S. Pat. No. 7,116,387 (Tsai et al.). In particular, retardation can be controlled to multiple levels on a pixel-by-pixel basis e.g. for color compensation and viewing angle. Multi-level retarders, i.e., composite retarder films that have distinct and well-defined high, low, and at least one intermediate value of retardation, and/or composite films that utilize both a patternable retarder film and a patternable STOF reflector, can be used in these applications.

Figure 2A:
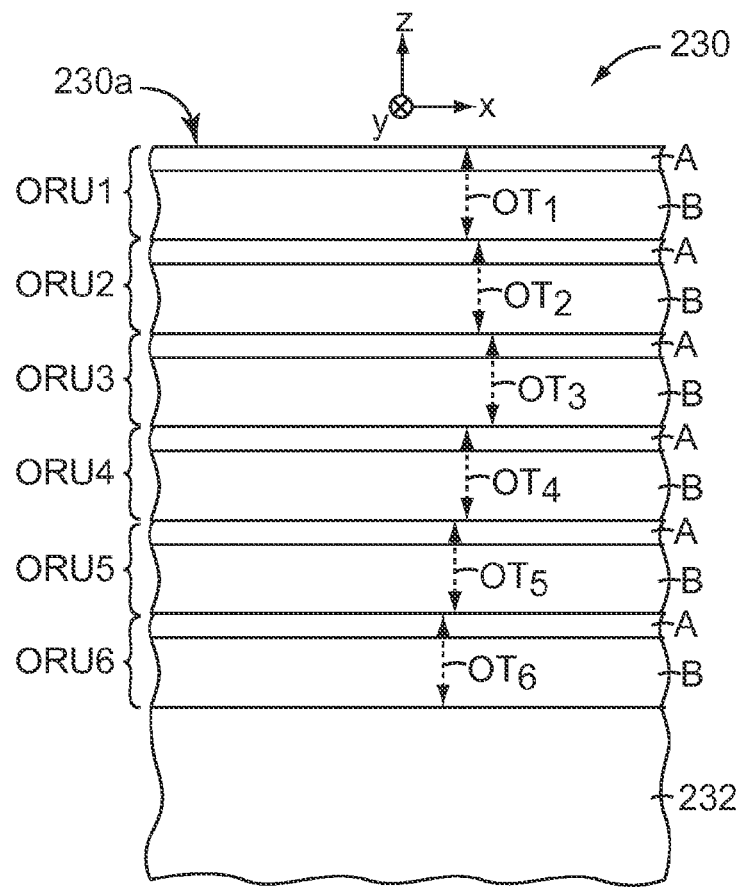
FIG. 2A is a schematic side view of a portion of a multilayer optical film.

Turning now to FIG. 2A, we see there a portion of a multilayer film 230 in schematic side view to reveal the structure of the film including its interior layers. Such a film may be used as a blocking layer in the disclosed embodiments, and, if it is made to have suitable absorptive characteristics, may also be used as a patternable reflector or STOF film in the disclosed embodiments. The film is shown in relation to a local x-y-z Cartesian coordinate system, where the film extends parallel to the x- and y-axes, and the z-axis is perpendicular to the film and its constituent layers and parallel to a thickness axis of the film. Neither the film 230 nor the composite film of which it is a part need be entirely flat. They may be curved or otherwise shaped to deviate from a plane, and even in those cases arbitrarily small portions or regions of the film can be associated with a local Cartesian coordinate system as shown. The film 230 may be considered to represent a blocking layer and/or one of the functional layers of the composite film 210 of FIG. 2, and/or of the composite film 110 of FIG. 1 in any of its zones 112, 114, 116, since the individual layers or films of the composite film 110 preferably extend continuously from each such zone to the next.

Multilayer optical films include individual layers having different refractive indices so that some light is reflected at interfaces between adjacent layers. These layers, sometimes referred to as "microlayers", are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. In FIG. 2A, the microlayers are labeled "A" or "B", the "A" layers being composed of one material and the "B" layers being composed of a different material, these layers being stacked in an alternating arrangement to form optical repeat units or unit cells ORU 1, ORU 2, . . . ORU 6 as shown. Typically, a multilayer optical film composed entirely of polymeric materials would include many more than 6 optical repeat units if high reflectivities are desired. Note that all of the "A" and "B" microlayers shown in FIG. 2A may be interior layers of film 210, except in some embodiments for the uppermost "A" layer whose upper surface in this illustrative example coincides with the outer surface 230a of the film 230. The substantially thicker layer 232 at the bottom of the figure can represent an outer skin layer, or a PBL that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

In some cases, the microlayers can have thicknesses and refractive index values corresponding to a ¼-wave stack, i.e., arranged in optical repeat units each having two adjacent microlayers of equal optical thickness (f-ratio=50%, the f-ratio being the ratio of the optical thickness of a constituent layer "A" to the optical thickness of the complete optical repeat unit), such optical repeat unit being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. In the embodiment of FIG. 2, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength λ is twice its overall optical thickness. The reflectivity provided by microlayer stacks or packets used in multilayer optical films in general, and by internally patterned multilayer films discussed herein in particular, is typically substantially specular in nature, rather than diffuse, as a result of the generally smooth well-defined interfaces between microlayers, and the low haze materials that are used in a typical construction. In some cases, however, the finished article may be tailored to incorporate any desired degree of scattering, e.g., using a diffuse material in skin layer(s) and/or PBL layer(s), and/or using one or more surface diffusive structures or textured surfaces, for example.

In some embodiments, the optical thicknesses of the optical repeat units in a layer stack may all be equal to each other, to provide a narrow reflection band of high reflectivity centered at a wavelength equal to twice the optical thickness of each optical repeat unit. In other embodiments, the optical thicknesses of the optical repeat units may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, as discussed in U.S. Pat. No. 6,157,490 (Wheatley et al.) "Optical Film With Sharpened Bandedge". For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired reflection band resides in or extends to near infrared wavelengths. See, e.g., U.S. Pat. No. 5,103,337 (Schrenk et al.) "Infrared Reflective Optical Interference Film", U.S. Pat. No. 5,360,659 (Arends et al.) "Two Component Infrared Reflecting Film", U.S. Pat. No. 6,207,260 (Wheatley et al.) "Multicomponent Optical Body", and U.S. Pat. No. 7,019,905 (Weber) "Multi-layer Reflector With Suppression of High Order Reflections".

The thickness gradient and optical repeat unit design may thus be tailored as desired to provide the disclosed multilayer optical films, whether in a treated or untreated zone thereof, and whether for light of one polarization state or for unpolarized light, with a substantial reflectivity in a limited spectral band. For example, the substantial reflectivity may be at least 50%, or at least 60, 70, 80, or 90% or more, over only substantially one spectral band, the band being disposed in the visible or in any other desired portion of the spectrum. The band may have a bandwidth of less than 200, or 150, or 100, or 50 nm or less, for example, which may be measured as a full-width at half-maximum (FWHM) reflectivity. As noted above, the band may be associated with zero-order reflection, or with a desired higher order reflection if the optical repeat unit is suitably designed.

As mentioned above, adjacent microlayers of the multilayer optical film have different refractive indices so that some light is reflected at interfaces between adjacent layers. We refer to the refractive indices of one of the microlayers (e.g. the "A" layers in FIG. 2) for light polarized along principal x-, y-, and z-axes as n1x, n1y, and n1z, respectively. We refer to the refractive indices of the adjacent microlayer (e.g. the "B" layers in FIG. 2) along the same axes as n2x, n2y, n2z, respectively. The x-, y-, and z-axes may, for example, correspond to the principal directions of the dielectric tensor of the material. Typically, and for discussion purposes, the principle directions of the different materials are coincident, but this need not be the case in general. We refer to the differences in refractive index between these layers as Δnx (=n1x−n2x) along the x-direction, Δny (=n1y−n2y) along the y-direction, and Δnz (=n1z−n2z) along the z-direction. The nature of these refractive index differences, in combination with the number of microlayers in the film (or in a given stack of the film) and their thickness distribution, controls the reflective and transmissive characteristics of the film (or of the given stack of the film) in a given zone. For example, if adjacent microlayers have a large refractive index mismatch along one in-plane direction (Δnx large) and a small refractive index mismatch along the orthogonal in-plane direction (Δny≈0), the film or packet may behave as a reflective polarizer for normally incident light. In this regard, a reflective polarizer may be considered for purposes of this application to be an optical body that strongly reflects normally incident light that is polarized along one in-plane axis (referred to as the "block axis") if the wavelength is within the reflection band of the packet, and strongly transmits such light that is polarized along an orthogonal in-plane axis (referred to as the "pass axis"). "Strongly reflects" and "strongly transmits" may have different meanings depending on the intended application or field of use, but in many cases a reflective polarizer will have at least 70, 80, or 90% reflectivity for the block axis, and at least 70, 80, or 90% transmission for the pass axis.

For purposes of the present application, a material is considered to be "birefringent" if the material has an anisotropic dielectric tensor over a wavelength range of interest, e.g., a selected wavelength or band in the UV, visible, and/or infrared portions of the spectrum. Stated differently, a material is considered to be "birefringent" if the principal refractive indices of the material (e.g., n1x, n1y, n1z) are not all the same. The "birefringence" of a given material or layer may then refer to the difference between its maximum principal refractive index and its minimum principal refractive index, unless otherwise indicated. Negligible amounts of birefringence can generally be ignored. In the case of a blended layer for a diffusely reflective film, a constituent material in the continuous phase preferably exhibits a birefringence of at least 0.03, or 0.05, or 0.10. In some cases, the birefringence of any given material or layer may be specified to be at least 0.02, or 0.03, or 0.05, for example. In another example, adjacent microlayers may have a large refractive index mismatch along both in-plane axes ($\Delta nx$ large and $\Delta ny$ large), in which case the film or packet may behave as an on-axis mirror. In this regard, a mirror or mirror-like film may be considered for purposes of this application to be an optical body that strongly reflects normally incident light of any polarization if the wavelength is within the reflection band of the packet. Again, "strongly reflecting" may have different meanings depending on the intended application or field of use, but in many cases a mirror will have at least 70, 80, or 90% reflectivity for normally incident light of any polarization at the wavelength of interest.

In variations of the foregoing embodiments, the adjacent microlayers may exhibit a refractive index match or mismatch along the z-axis ($\Delta nz \approx 0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle. In yet another example, adjacent microlayers may have a substantial refractive index match along both in-plane axes ($\Delta nx \approx \Delta ny \approx 0$) but a refractive index mismatch along the z-axis ($\Delta nz$ large), in which case the film or packet may behave as a so-called "p-polarizer", strongly transmitting normally incident light of any polarization, but increasingly reflecting p-polarized light of increasing incidence angle if the wavelength is within the reflection band of the packet.

In view of the large number of permutations of possible refractive index differences along the different axes, the total number of layers and their thickness distribution(s), and the number and type of microlayer packets included in the multilayer optical film, the variety of possible multilayer optical films 210 and packets thereof is vast. We refer to multilayer optical films disclosed in any of the patent documents cited herein (whether or not patented, and whether published by the U.S. Patent Office or by any another country or patent authority), as well as the following documents, all of which are incorporated herein by reference: U.S. Pat. No. 5,486,949 (Schrenk et al.) "Birefringent Interference Polarizer"; U.S. Pat. No. 5,882,774 (Jonza et al.) "Optical Film"; U.S. Pat. No. 6,045,894 (Jonza et al.) "Clear to Colored Security Film"; U.S. Pat. No. 6,179,949 (Merrill et al.) "Optical Film and Process for Manufacture Thereof"; U.S. Pat. No. 6,531,230 (Weber et al.) "Color Shifting Film"; U.S. Pat. No. 6,939,499 (Merrill et al.) "Processes and Apparatus for Making Transversely Drawn Films with Substantially Uniaxial Character"; U.S. Pat. No. 7,256,936 (Hebrink et al.) "Optical Polarizing Films with Designed Color Shifts"; U.S. Pat. No. 7,316,558 (Merrill et al.) "Devices for Stretching Polymer Films"; PCT Publication WO 2008/144136 A1 (Nevitt et al.) "Lamp-Hiding Assembly for a Direct Lit Backlight"; PCT Publication WO 2008/144656 A2 (Weber et al.) "Backlight and Display System Using Same".

At least some of the microlayers in each interior packet that is intended to be independently patterned are birefringent before the selective heat treatment, and preferably also are birefringent in at least one zone of the finished film (e.g., zones 112, 114, 116 of FIG. 1) after heat treatment. Thus, a first layer in the optical repeat units of a particular layer packet may be birefringent (i.e., $n1x \neq n1y$, or $n1x \neq n1z$, or $n1y \neq n1z$), or a second layer in the optical repeat units of such packet may be birefringent (i.e., $n2x \neq n2y$, or $n2x \neq n2z$, or $n2y \neq n2z$), or both the first and second layers may be birefringent. Moreover, the birefringence of one or more such layers is diminished in at least one zone relative to a neighboring zone. In some cases, the birefringence of these layers may be diminished to zero, such that they are optically isotropic (i.e., $n1x=n1y=n1z$, or $n2x=n2y=n2z$) in one zone but birefringent in a neighboring zone. In cases where both layers are initially birefringent, depending on materials selection and processing conditions, they can be processed in such a way that the birefringence of only one of the layers is substantially diminished, or the birefringence of both layers may be diminished.

Exemplary multilayer optical films and microlayer packets thereof are composed of polymer materials and may be fabricated using a variety of flow processes, including coextrusion, film casting, and film stretching or drawing processes. Typically, birefringence is developed in at least some layers through one or more of these various flow processes. Reference is made to U.S. Pat. No. 5,882,774 (Jonza et al.) "Optical Film", U.S. Pat. No. 6,179,949 (Merrill et al.) "Optical Film and Process for Manufacture Thereof", and U.S. Pat. No. 6,783,349 (Neavin et al.) "Apparatus for Making Multilayer Optical Films". The multilayer optical film may be formed by coextrusion of the polymers as described in any of the aforementioned references. The polymers of the various layers are preferably chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range. Without wishing to be limited, materials that may be useful in fabricating multilayer optical films as well as retarder films and/or other components of the disclosed composite films may include polymers such as one or more of: polyesters such as polyethylene terephthalate (PET), polyethylene naphthalate (PEN), and copolymers thereof, particularly the so-called "coPENs"; polystyrenes; polyacrylates; and polycarbonates.

In brief summary, the fabrication method of a multilayer optical film may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

Many alternative methods of fabricating the cast multilayer web can also be used. One such alternative method that also utilizes polymer coextrusion is described in U.S. Pat. No. 5,389,324 (Lewis et al.).

After cooling, the multilayer web can be drawn or stretched to produce the near-finished multilayer optical film, details of which can be found in the references cited above. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

In some cases, a patternable composite film that has been designed specifically for bi-level patterning, and which may include a first group of interior layers such as a first microlayer stack, a second group of interior layers such as a second microlayer stack, and a reflecting or absorbing blocking layer disposed between the first and second groups of interior layers, may be made in a single film-forming operation in which substantially all of the various constituent layers are coextruded, and then cast, and then stretched simultaneously. Alternatively, a patternable composite film adapted for bi-level patterning may be made in a sequential fashion wherein two or more films are made in separate film-forming operations, each or some of which may involve coextrusion, casting, and stretching, and wherein the resulting films are then laminated or otherwise joined together before being exposed to the directed radiation responsible for the selective heating and patterning.

The disclosed bi-level patternable composite films may also include additional layers and coatings selected for their optical, mechanical, and/or chemical properties. For example, a UV absorbing layer can be added at one or both major outer surfaces to protect the film from long-term degradation caused by UV light. Additional layers and coatings can also include scratch resistant layers, tear resistant layers, and stiffening agents. See, e.g., U.S. Pat. No. 6,368,699 (Gilbert et al.).

In some cases, the natural or inherent absorptivity of one, some, or all of the constituent polymer materials that make up the bi-level patternable composite film may be utilized for the absorptive heating procedure. For example, many polymers that are low loss over the visible region have substantially higher absorptivity at certain ultraviolet and/or infrared wavelengths. Exposing portions of the film to light of such wavelengths may be used to selectively heat such portions of the film. Moreover, the natural or inherent absorptivity of the material(s) that make up the blocking layer (s) may be exploited to provide the necessary blocking of light of the write wavelength between groups of interior layers to allow the patternwise modification of one such group independent of another such group.

In other cases, absorbing dyes, pigments, or other agents can be incorporated into some or all of the individual layers or constituent materials of the patternable composite films to promote absorptive heating as mentioned above, and/or to provide the necessary attenuation of light of the write wavelength in the blocking layer(s). In some cases, such absorbing agents are spectrally selective, whereby they absorb in one wavelength region but not in another. For example, some of the disclosed films may be intended for use in the visible region, such as with anti-counterfeiting security labels or as a component of a liquid crystal display (LCD) device or other display device, in which case an absorbing agent that absorbs at infrared or ultraviolet wavelengths but not substantially at visible wavelengths may be used. Further, an absorbing agent may be incorporated into one or more selected layers or materials of a film. For example, a multilayer optical film may comprise two distinct microlayer packets separated by an optically thick layer such as a protective boundary layer (PBL), a laminating adhesive layer, one or more skin layers, or the like, and an absorbing agent may be incorporated into one of the packets and not the other, or may be incorporated into both packets but at a higher concentration in one relative to the other. Further, a diffusely reflective film (see e.g. FIG. 2B) may comprise two distinct blended layers separated by an optically thick intermediate layer such as a laminating adhesive layer, one or more skin layers, or the like, and an absorbing agent may be incorporated into one of the blended layers and not the other, or may be incorporated into both blended layers but at a higher concentration in one relative to the other.

Figure 2B:
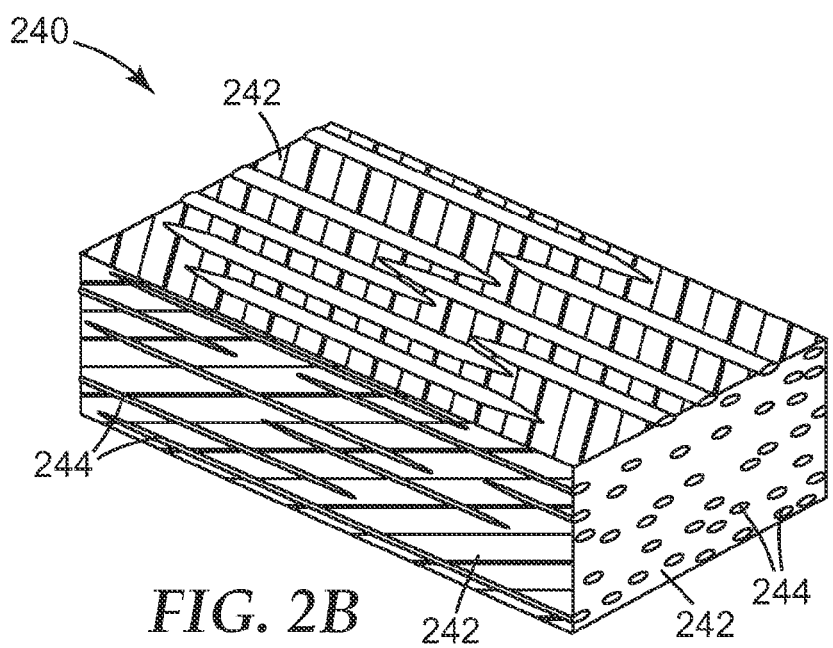
FIG. 2B is a schematic side view of a portion of a diffusely reflective optical film.

In FIG. 2B, we see a portion of a blended layer of a diffusely reflective optical film 240 in schematic perspective view to reveal the interior structure or blend morphology of the layer/film. We refer to the film as a diffusely reflective optical film even in cases where the film may have a high transparency with little or no haze, i.e., where it has a window-like appearance, so long as such film was derived from, or can be processed into, a film that diffusely reflects or diffusely transmits light of a given incidence direction and polarization state in accordance with the selective heating techniques set forth herein. Such a film may be used as a blocking layer in the disclosed embodiments, and, if it is made to have suitable absorptive characteristics, may also be used as a patternable diffuse reflector or STOF film in the disclosed embodiments. The film 240 is shown in relation to a local x-y-z Cartesian coordinate system, where the film extends parallel to the x- and y-axes, and the z-axis is perpendicular to the film and parallel to a thickness axis of the film. The film 240 need not be entirely flat, but may be curved or otherwise shaped as was discussed above in connection with multilayer optical film 230. The film 240 may be considered to represent a blocking layer and/or one of the functional layers of the composite film 210 of FIG. 2, and/or of the composite film 110 of FIG. 1 in any of its zones 112, 114, 116, since the composite film 110 may include a blended layer that extends continuously from each such zone to the next. As depicted, film 240 includes a first light-transmissive polymer or other material which is in the form of a continuous or matrix phase 242, and a second light-transmissive polymer or other material which is in the form of a discontinuous or disperse phase 244.

Many different materials may be used to fabricate the disclosed diffusely reflective optical films, depending on the specific application to which the composite optical film (of which the diffusely reflective film may be a part) is directed. Such materials may include inorganic materials such as silica-based polymers, organic materials such as liquid crystals, and polymeric materials, including monomers, copolymers, grafted polymers, and mixtures or blends thereof. The exact choice of materials for a given application will be driven by the desired match and/or mismatch obtainable in the refractive indices of the different phases along a particular axis, as well as the desired physical properties in the resulting product. In cases where one of the materials is present in the blended layer in a continuous phase, such material will generally be characterized by being substantially transparent in the region of the spectrum desired.

At least some of the diffusely reflective films disclosed herein, and/or the blended layers thereof, may be composed substantially entirely of polymeric materials, although in some cases non-polymeric materials may also be used. In some cases, only two different polymeric materials may be used, but in other cases more than two such polymeric materials may be used.

A further consideration in the choice of materials is that the resulting diffusely reflective film desirably contains at least two distinct phases in order to form the microscopic structures within the blended layer that can provide the desired scattering. This may be accomplished by casting the optical material from two or more materials which are immiscible with each other. Alternatively, if it is desired to make an optical material with two materials that are not immiscible with each other, and if one of the materials has a higher melting point than the other material, in some cases it may be possible to embed particles of appropriate dimensions of the one material within a molten matrix of the other material at a temperature below the melting point of the one material. The resulting mixture can then be cast into a film, with subsequent and/or simultaneous orientation, to produce an oriented optical film or body.

The materials selected for use in the disclosed diffusely reflective films, and the degree of orientation of these materials, may in some cases be chosen so that the different materials in the blended layer of the finished film, whether in a heat-treated zone thereof or in a zone that has not been heat treated, have at least one axis for which the associated indices of refraction are substantially equal. The match of refractive indices associated with that axis, which typically, but not necessarily, is an axis transverse to the direction of orientation, results in substantially no reflection of light in that plane of polarization.

At least one material (e.g. in the form of a disperse phase) may exhibit a decrease in the refractive index associated with the direction of orientation after stretching. If another material (e.g. in the form of a continuous phase) is positive, a negative strain induced birefringence of the first material has the advantage of increasing the difference between indices of refraction of the adjoining phases associated with the orientation axis while the reflection of light with its plane of polarization perpendicular to the orientation direction may still be negligible. If a reflective polarizer is desired, differences between the indices of refraction of adjoining phases in the in-plane direction orthogonal to the orientation direction should be less than about 0.05 after orientation, and preferably, less than about 0.02, in the wavelength band of interest, such as the visible.

Material in the form of a disperse phase may also exhibit a positive strain-induced birefringence. However, this can be altered by means of heat treatment to match the refractive index of the axis perpendicular to the orientation direction of the other material (e.g. in the form of a continuous phase). The temperature of the heat treatment should not be so high as to relax the birefringence in the continuous phase.

The size of the structures or features in the disperse phase also can have a significant effect on scattering. If the disperse phase particles are too small (e.g., less than about $\frac{1}{30}$ the wavelength of light in the medium of interest) and if there are many particles per cubic wavelength, the optical body may behave as a medium with an effective index of refraction somewhat between the indices of the two phases along any given axis. In such a case, very little light is scattered. If the particles are very large, the number of particles that can be accommodated per unit volume of the blended layer becomes low, and light may be specularly reflected from the surface of the particle, with very little diffusion or scattering into other directions. If such very large particles become disk-shaped or flattened along the x- and y-directions, iridescence effects (which may or may not be desirable) may occur. Practical limits may also be reached when particles become large in that the thickness of the optical body becomes greater and desirable mechanical properties are compromised.

The dimensions of the particles of the disperse phase after alignment can be tailored depending on the desired use of the optical material. Thus, for example, the dimensions of the particles may be tailored depending on the wavelength of electromagnetic radiation that is of interest in a particular application, with different dimensions required for reflecting or transmitting visible, ultraviolet, infrared, and microwave radiation. Generally, however, the length of the particles should be such that they are approximately greater than the wavelength of electromagnetic radiation of interest in the medium, divided by 30.

In applications where the diffusely reflective film is to be used as a low loss reflective polarizer, the particles may have a length that is greater than about 2 times the wavelength of the electromagnetic radiation over the wavelength range of interest, and preferably over 4 times the wavelength. The average diameter of the particles may be equal to or less than the wavelength of the electromagnetic radiation over the wavelength range of interest, and preferably less than 0.5 of the desired wavelength. While the dimensions of the disperse phase are a secondary consideration in most applications, they become of greater importance in thin film applications, where there is comparatively little diffuse reflection.

While in many cases the refractive index mismatch may be the predominant factor relied upon to promote scattering (e.g., a diffuse mirror or polarizer film may have a substantial mismatch in the indices of refraction of the continuous and disperse phases along at least one in-plane axis), changes to the geometry of the particles of the disperse phase may also have an effect (e.g. a secondary effect) on scattering. Thus, the depolarization factors of the particles for the electric field in the index of refraction match and mismatch directions can reduce or enhance the amount of scattering in a given direction. For example, when the disperse phase is elliptical in a cross-section taken along a plane perpendicular to the axis of orientation (see e.g. disperse phase 244 in FIG. 2B), the elliptical cross-sectional shape of the disperse phase can contribute to asymmetric diffusion in both back-scattered light and forward-scattered light. The effect can either add to or detract from the amount of scattering caused by the refractive index mismatch, but typically has a relatively small influence on scattering.

The shape of the disperse phase particles can also influence the degree of diffusion of light scattered from the particles. This shape effect is typically small but increases as the aspect ratio of the geometrical cross-section of the particle in the plane perpendicular to the direction of incidence of the light increases and as the particles get relatively larger. It is often desirable for the disperse phase particles to be sized less than several wavelengths of light in one or two mutually orthogonal dimensions if diffuse, rather than specular, reflection is desired.

For a low loss diffusely reflective polarizer, the film may consist of a disperse phase disposed within the continuous phase as a series of rod-like structures which, as a consequence of orientation, have a high aspect ratio which can enhance reflection for polarizations parallel to the orientation direction by increasing the scattering strength and dispersion for that polarization relative to polarizations perpendicular to the orientation direction. However, the particles or structures of the disperse phase may be provided with many different geometries. Thus, the disperse phase may be disk-shaped or elongated disk-shaped, or rod-shaped, or spherical. Further information in this regard can be found in commonly assigned U.S. Application Ser. No. 61/360,124, "Diffuse Reflective Optical Films With Spatially Selective Birefringence Reduction", filed Jun. 30, 2010.

Besides a continuous/disperse phase combination, the different polymers that make up the blended layer of the diffusely reflective film may alternatively be arranged in a co-continuous phase relationship. Further details of co-continuous phase constructions can be found e.g. in U.S. Pat. No. 7,057,816 (Allen et al.). The two phases in a co-continuous phase construction may be fibrillar and form an interpenetrating polymer network (IPN). The fibers may be randomly oriented, or oriented along a given axis. Other co-continuous systems may comprise an open-celled matrix of a first material (first phase), with a second material disposed in a co-continuous manner (second phase) within the cells of the matrix.

The different materials used in the different phases of the diffusely reflective optical films have different refractive indices along a particular direction or axis, whether in a heat-treated zone thereof or in a zone that has not been heat treated, so that some light polarized along such direction or axis is reflected at interfaces between the adjacent phases, and collectively scattered. We may refer to the refractive indices of a first material in the blended layer (e.g., in FIG. 2B, the first light-transmissive polymer in the form of continuous phase 242) for light polarized along principal x-, y-, and z-axes as $n1x$, $n1y$, and $n1z$, respectively. The x-, y-, and z-axes may, for example, correspond to the principal directions of the dielectric tensor of the material. Typically, and for discussion purposes, the principal directions of the different materials in the blended layer are coincident, but this need not be the case in general. We refer to the refractive indices of a second material (adjacent the first material) in the blended layer (e.g., in FIG. 2B, the second light-transmissive polymer or other material which is in the form of a discontinuous or disperse phase 244) along the same axes as $n2x$, $n2y$, $n2z$, respectively. We refer then to differences in refractive index between these materials or phases as $\Delta nx$ ($=n1x-n2x$) along the x-direction, $\Delta ny$ ($=n1y-n2y$) along the y-direction, and $\Delta nz$ ($=n1z-n2z$) along the z-direction. The nature of these refractive index differences, in combination with the thickness, composition (e.g. volume fraction of the first and second materials in the blended layer), and blend morphology (e.g., the size, shape, and distribution of structures of the first polymer and structures of the second polymer in the blended layer) of the blended layer, controls the reflective and transmissive characteristics of such layer, in a given zone. For example, if adjacent phases have a large refractive index mismatch along one in-plane direction ($\Delta nx$ large) and a small refractive index mismatch along the orthogonal in-plane direction ($\Delta ny \approx 0$), the film or blended layer may behave as a diffusely reflective polarizer for normally incident light. In this regard, a diffusely reflective polarizer may be considered for purposes of this application to be an optical body that strongly diffusely reflects normally incident light that is polarized along one in-plane axis (referred to as the "block axis"), and strongly transmits such light that is polarized along an orthogonal in-plane axis (referred to as the "pass axis"). "Strongly reflects" and "strongly transmits" may have different meanings depending on the intended application or field of use, but in many cases a diffusely reflective polarizer will have at least 70, 80, 90, or 95% reflectivity for the block axis, and at least 70, 80, or 85% transmission (includes outer surface effects) for the pass axis.

In another example, adjacent phases may have a large refractive index mismatch along both in-plane axes ($\Delta nx$ large and $\Delta ny$ large), in which case the film or blended layer may behave as an on-axis diffuse mirror. In this regard, a diffuse mirror or mirror-like film may be considered for purposes of this application to be an optical body that strongly diffusely reflects normally incident light of any polarization. Again, "strongly diffusely reflecting" may have different meanings depending on the intended application or field of use, but in many cases a diffuse mirror will have at least 70, 80, or 90% reflectivity for normally incident light of any polarization at the wavelength of interest.

In variations of the foregoing embodiments, the adjacent phases may exhibit a refractive index match or mismatch along the z-axis ($\Delta nz \approx 0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle.

There are a large number of permutations of possible refractive index differences between adjacent phases along the different axes, possible thicknesses of the blended layer, possible compositions of the blended layer, and possible morphologies of the blended layer. Hence, the variety of possible diffusely reflective films and blended layers thereof is vast. Exemplary diffusely reflective optical films that comprise at least one blended layer are disclosed in U.S. Pat. No. 5,825,543 (Ouderkirk et al.), U.S. Pat. No. 6,179,948 (Merrill et al.), and U.S. Pat. No. 7,057,816 (Allen et al.).

At least one of the materials that form one of the phases in the blended layer of the optical film is birefringent in at least one zone of the film (e.g., zones 112, 114, 116 of FIG. 1). Thus, a first phase in the blended layer may be birefringent (i.e., $n1x \neq n1y$, or $n1x \neq n1z$, or $n1y \neq n1z$), or a second phase in the blended layer may be birefringent (i.e., $n2x \neq n2y$, or $n2x \neq n2z$, or $n2y \neq n2z$), or both the first and second phases may be birefringent. Moreover, the birefringence of one or more such phases is diminished in at least one zone relative to a neighboring zone. In some cases, the birefringence of these phase(s) may be diminished to zero, such that it or they are optically isotropic (i.e., $n1x=n1y=n1z$, or $n2x=n2y=n2z$) in one of the zones but birefringent in a neighboring zone. In cases where both phases are initially birefringent, depending on materials selection and processing conditions, they can be processed in such a way that the birefringence of only one of the phases is substantially diminished, or the birefringence of both phases may be diminished.

Exemplary diffusely reflective optical films are composed of polymer materials and may be fabricated using techniques discussed in commonly assigned U.S. Application Ser. No. 61/360,124, "Diffuse Reflective Optical Films With Spatially Selective Birefringence Reduction", filed Jun. 30, 2010. Reference is also made to U.S. Pat. No. 6,179,949 (Merrill et al.) "Optical Film and Process for Manufacture Thereof".

As already mentioned, a variety of absorbing agents can be used in the retarder films and/or reflective films of the disclosed composite films to enhance bi-level patternability by the radiant beams. For optical films operating in the visible spectrum, dyes, pigments, or other additives that absorb in the ultraviolet and infrared (including near infrared) regions may be used. In some cases it may be advantageous to select an agent that absorbs in a spectral range for which the polymer materials of the film have a substantially lower absorption. By incorporating such an absorbing agent into selected layers of a composite film, directed radiation can preferentially deliver heat to the selected layers rather than throughout the entire thickness of the film. Exemplary absorbing agents may be melt extrudable so that they can be embedded into a selected layer set of interest. To this end, the absorbers are preferably reasonably stable at the processing temperatures and residence times required for extrusion. Some potential IR dyes include any of the Nickel, Palladium, and Platinum-based dyes available from Epolin, Inc. under the tradename Epolight™. Other suitable candidates include Amaplast™-brand dyes, available from Color Chem International Corp., Atlanta, Ga. Other potentially suitable absorbing agents can be found in U.S. Pat. No. 6,207,260 (Wheatley et al.) "Multicomponent Optical Body".

In some cases the absorbing agent may be a non-linear absorber, i.e., it may be or comprise a composition in which the light energy absorption coefficient is intensity or fluence dependent, where intensity refers to energy per unit area per unit time, and fluence refers to energy density or energy per unit area. Nonlinear light absorbers may be of the two-photon absorption type or the reverse saturable absorption type, for example.

The two-photon absorption process is a nonlinear light absorption process in which the photon energy is approximately equal to half the energy required for linear excitation of the material. Excitation of the absorbing material therefore requires the simultaneous absorption of two of the lower energy photons. Examples of useful two-photon absorbers include those exhibiting large multiphoton absorption cross-sections, such as Rhodamine B (that is, N-[9-(2-carboxyphenyl)-6-(diethylamino)-3H-xanthen-3-ylidene]-N-ethylethanaminium chloride and the hexafluoroantimonate salt of Rhodamine B) and the four classes of photosensitizers described, for example, in PCT Publications WO 98/21521 (Marder et al.) and WO 99/53242 (Cumptson et al.).

The reverse saturable absorption process is also sometimes referred to as excited state absorption, and is characterized by the absorption cross section for the excited state involved in the absorption process being much larger than the cross section for excitation from the ground state to the excited state. The total light absorption involves both ground state absorption and excited state absorption. Examples of reverse saturable absorption materials include, for example, metallophthalocyanines, naphthalocyanines, cyanines, fullerenes, metal nanoparticles, metal oxide nanoparticles, metal cluster compounds, porphyrins, indanthrone derivatives and oligomers or combinations thereof. Examples of metallophthalocyanines include, for example, copper phthalocyanine (CuPC), and phthalocyanines containing metal or metalloids from group IIIA (Al, Ga, In) and IVA (Si, Ge, Sn, Pb). Examples of naphthalocyanines include, for example, the phthalocyanine derivatives of silicon (SiNC), tin (SnNC), and lead (PbNC). Examples of cyanines include, for example, 1,3,3,1',3',3'-hexamethylindotricarbocyanine iodide (HITCI). Examples of fullerenes include C60 and C70 fullerenes. Examples of metal nanoparticles include gold, silver, aluminum, and zinc nanoparticles. Examples of metal oxide nanoparticles include titanium dioxide, antimony tin oxide, and zirconium dioxide nanoparticles. Examples of metal clusters include iron tricobalt metal clusters such as $HFeCo_3(CO)_{12}$ and $NEt_4FeCO_3(CO)_{12}$. Examples of porphyrins include tetraphenylporphyrin (H2TPP), zinc tetraphenylporphyrin (ZnTPP), and cobalt tetraphenylporphyrin (CoTPP). Examples of indanthrone derivatives include unsubstituted indanthrone, oxidized indanthrone, chloroindanthrone, and an indanthrone oligomer.

Figure 3:
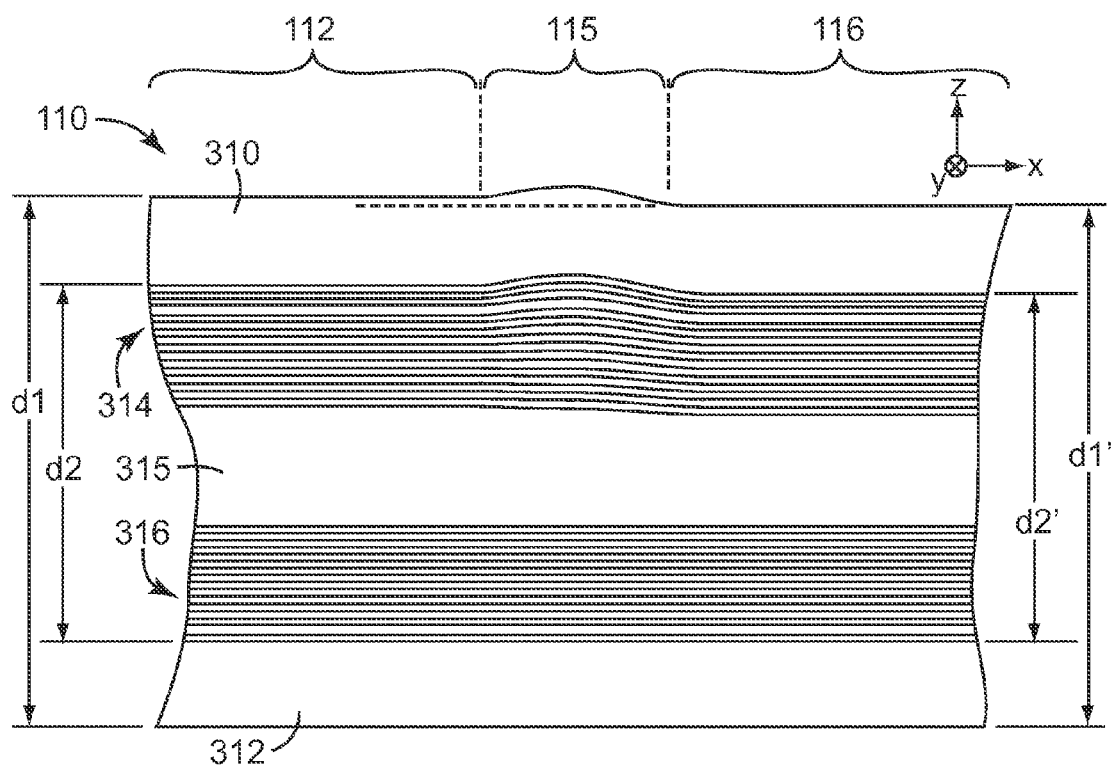
FIG. 3 is a schematic sectional view of a portion of the composite optical film of FIG. 1.

We turn now to FIG. 3, which shows a schematic sectional view of a portion of the composite film 110 of FIG. 1 in the vicinity of area 118 at a boundary of zone 112 and zone 116. In this expanded view of the film 110, a narrow transition zone 115 can be seen separating the zone 112 from the neighboring zone 116. Such a transition zone may or may not be present depending on processing details, and if it is not present then zone 116 may be immediately adjacent to zone 112 with no significant intervening features. Construction details of film 110 can also be seen: the film includes separately patternable retarder films 310, 312 (which may be skin layers) on opposite sides thereof, with a plurality of microlayers 314 and another plurality of microlayers 316 disposed between the films 310, 312. The microlayers 314 may form a first blocking layer, and the microlayers 316 may form a second blocking layer. Between these groups of microlayers is another patternable retarder film 315, which may for example be a protective boundary layer (PBL). All of the microlayers 314, 316 are interior to the film 110 by virtue of the outer skin layers.

In an alternative interpretation of FIG. 3, element 310 may be a patternable retarder film, element 314 may be a microlayer packet functioning as a blocking layer, element 316 may be a microlayer packet functioning as a patternable reflective film, and elements 315 and 312 may be non-birefringent elements, for example, element 315 may be a conventional adhesive layer and element 312 may be a conventional substrate. In such case, a first radiant beam may be used to change a first light retardation of element 310 to a second light retardation (e.g., zero retardation) in a first pattern, and a second radiant beam may be used to change a first reflective characteristic of element 316 to a second reflective characteristic. For ease of description, this alternative interpretation of FIG. 3 will be assumed for the remainder of the discussion of FIG. 3 unless otherwise indicated.

The microlayers 314, 316 preferably each comprise two alternating polymer materials arranged into optical repeat units, each of the microlayers 314, 316 extending continuously in a lateral or transverse fashion from the zone 112 to the neighboring zone 116 as shown. The microlayers 316 provide a first reflective characteristic in the zone 112 by constructive or destructive interference, and at least some of the microlayers 316 are birefringent in this zone. Retarder film 310 provides a first retardation in the zone 112. The first reflective characteristic and the first retardation combine to provide the composite film with an overall first composite optical characteristic in the zone 112. In zones 115, 116, the constituent elements of film 110 may have previously had the same respective optical characteristics as they do in zone 112, but one or both of the microlayers 316 and the retarder film 310 have been processed by the selective application of heat thereto in an amount sufficient to reduce or eliminate the birefringence of some of their respective layers in the zone 116, while maintaining the structural integrity of those layers in the treated zone 116 and also maintaining the birefringence of those layers in zone 112, so that the composite film has a second composite optical characteristic in zone 116 different from the first composite optical characteristic. The reduced birefringence of the microlayers 316 and/or of the retarder film 310 in the zone 116 is primarily responsible for the difference between the first composite optical characteristic in zone 112 and the second composite optical characteristic in zone 116.

The film 110 has characteristic thicknesses d1, d2 in zone 112, and characteristic thicknesses d1', d2' in zone 116, as shown in the figure. The thicknesses d1, d1' are physical thicknesses measured from a front outer surface of the film to a rear outer surface of the film in the respective zones. The thicknesses d2, d2' are physical thicknesses measured from the microlayer (at one end of a microlayer packet) that is disposed nearest the front surface of the film to the microlayer (typically at an end of a different microlayer packet) that is disposed nearest the rear surface of the film. Thus, if one wishes to compare the thickness of the film 110 in zone 112 with the thickness of the film in zone 116, one may choose to compare d1 to d1', or d2 to d2', depending on which measurement is more convenient. In most cases the comparison between d1 and d1' may well yield substantially the same result (proportionally) as the comparison between d2 and d2'. (Of course, in cases where the film contains no outer skin layers, and where microlayer packets terminate at both outer surfaces of the film, d1 and d2 become the same.) However, where a significant discrepancy exists, such as where a skin layer experiences a significant thickness change from one place to another but no corresponding thickness change exists in the underlying microlayers, or vice versa, then it may be desirable to use the d2 and d2' parameters as being more representative of the overall film thickness in the different zones, in view of the fact that the skin layers typically have a minor effect on the reflective characteristics of the film compared to the microlayer packet(s).

For multilayer optical films containing two or more distinct microlayer packets separated from each other by optically thick layers, the thickness of any given microlayer packet can also be measured and characterized as the distance along the z-axis from the first to the last microlayer in the packet. This information may become significant in a more in-depth analysis that compares the physical characteristics of the film 110 in the different zones 112, 116.

As mentioned, the zone 116 has been treated with the selective application of heat to cause at least some of the microlayers 316, and/or the retarder film 310, to lose some or all of their birefringence relative to their birefringence in neighboring zone 112, such that zone 116 exhibits an optical characteristic, resulting from constructive or destructive interference of light from the microlayers in combination with optical retardation provided by film 310, that differs from an optical characteristic of zone 112. The selective heating process may involve no selective application of pressure to zone 116, and it may result in substantially no thickness change (whether using the parameters d1/d1' or the parameters d2/d2') to the film. For example, the film 110 may exhibit an average thickness in zone 116 that deviates from an average thickness in zone 112 by no more than the normal variability in thickness that one observes in the zone 112, or in the untreated film. Thus, the film 110 may exhibit in zone 112, or over an area of the film encompassing a portion of zone 112 and zone 116 before the heat treatment of zone 116, a variability in thickness (whether d1 or d2) of Δd, and the zone 116 may have spatially averaged thicknesses d1', d2' which differ from spatially averaged thicknesses d1, d2 (respectively) in zone 112 by no more than Δd. The parameter Δd may represent, for example, one, two, or three standard deviations in the spatial distribution of the thickness d1 or d2.

In some cases, the heat treatment of zone 116 may give rise to certain changes to the thickness of the film in zone 116. These thickness changes may result from, for example, local shrinkage and/or expansion of the different materials that constitute the composite film 110, or may result from some other thermally-induced phenomenon. However, such thickness changes, if they occur, play only a secondary role in their effect on the composite optical characteristic of the treated zone 116 compared to the primary role played by the reduction or elimination of birefringence in the treated zone. Note also that in many cases it may be desirable to hold the film by its edges under tension during the selective heat treatment that accomplishes the internal patterning, in order to avoid wrinkling of the film, or for other reasons. The amount of tension applied and details of the heat treatment may also result in some amount of thickness change in the treated zones.

In some cases it is possible to distinguish the effect of a thickness change from a change in birefringence by analyzing the reflective properties of the film. For example, if the microlayers in an untreated zone (e.g. zone 112) provide a reflection band characterized by a left band edge (LBE), right band edge (RBE), center wavelength $\lambda_c$, and peak reflectivity $R_1$, a given thickness change for those microlayers (with no change in the refractive indices of the microlayers) will produce a reflection band for the treated zone having a peak reflectivity $R_2$ about the same as $R_1$, but having an LBE, RBE, and center wavelength that are proportionally shifted in wavelength relative to those features of the reflection band of the untreated zone, and this shift can be measured. On the other hand, a change in birefringence will typically produce only a very minor shift in wavelength of the LBE, RBE, and center wavelengths, as a result of the (usually very small) change in optical thickness caused by the change in birefringence. (Recall that optical thickness equals physical thickness multiplied by refractive index.) The change in birefringence can, however, have a large or at least a significant effect on the peak reflectivity of the reflection band, depending on the design of the microlayer stack. Thus, in some cases, the change in birefringence may provide a peak reflectivity $R_2$ for the reflection band in the modified zone that differs substantially from $R_1$, where of course $R_1$ and $R_2$ are compared under the same illumination and observation conditions. If $R_1$ and $R_2$ are expressed in percentages, $R_2$ may differ from $R_1$ by at least 10%, or by at least 20%, or by at least 30%. As a clarifying example, $R_1$ may be 70%, and $R_2$ may be 60%, 50%, 40%, or less. Alternatively, $R_1$ may be 10%, and $R_2$ may be 20%, 30%, 40%, or more. $R_1$ and $R_2$ may also be compared by taking their ratio. For example, $R_2/R_1$ or its reciprocal may be at least 2, or at least 3.

A significant change in peak reflectivity, to the extent it is indicative of a change in the interfacial reflectivity (sometimes referred to as optical power) resulting from a change in refractive index difference between adjacent layers due to a change in birefringence, is also typically accompanied by at least some change in the bandwidth of the reflection band, where the bandwidth refers to the separation between the LBE and RBE.

As we have discussed, in some cases the thickness of the film 110 in the treated zone 116, i.e., d1' or d2', may differ somewhat from the thickness of the film in the untreated zone 112, even if no selective pressure was in fact applied to the zone 116 during heat treatment. For this reason, FIG. 3 depicts d1' as being slightly different from d1, and d2' as being slightly different from d2. A transition zone 115 is also shown for generality, to show that a "bump" or other detectable artifact may exist on the outer surface of the film as a consequence of the selective heat treatment. In some cases, however, the treatment may result in no detectable artifact between the neighboring treated and untreated zones. For example, in some cases an observer who slides his or her finger across the boundary between the zones may detect no bump, ridge, or other physical artifact between the zones.

Under some circumstances it is possible for thickness differences between treated and untreated zones to be non-proportional through the thickness of the film. For example, in some cases it is possible for an outer skin layer to have a relatively small thickness difference, expressed as a percentage change, between the treated and untreated zones, while one or more internal microlayer packets may have a larger thickness difference, also expressed as a percentage change, between the same zones.

Figure 4:
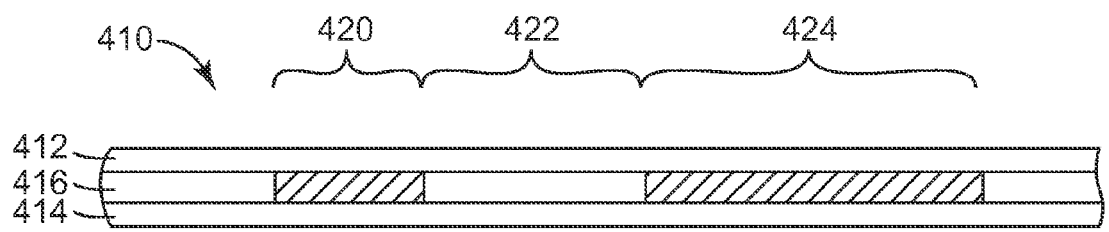
FIG. 4 is a schematic sectional view of a portion of another composite optical film that incorporates internal patterning.

FIG. 4 shows a schematic sectional view of a portion of another composite optical film 410 that incorporates internal patterning, where the internal patterning is accomplished in only one level of the film. Film 410 comprises outer optically thick skin layers 412, 414, and a packet of microlayers that reside in a stratum or layer 416 sandwiched between the skin layers. All of the microlayers are internal to the film 410. (In alternative embodiments, one or both skin layers may be omitted, in which case one or both PBLs or outermost microlayers in the packet may become external layers.) The microlayers include at least some microlayers that are birefringent in at least some zones or areas of the film and that extend in a lateral or transverse fashion at least between neighboring zones of the film. The microlayers provide a first reflective characteristic associated with constructive or destructive interference of light at least in a first untreated zone 422 of the film. The film 410 has been selectively heated in the neighboring zones 420, 424, without applying any pressure selectively to these zones, so as to provide a second reflective characteristic also associated with constructive or destructive interference of light, but that differs from the first reflective characteristic. (Note in this context that "first reflective characteristic" and "second reflective characteristic" may be interpreted as pertaining to only the packet of microlayers, or to the entire film.) These differences in reflective characteristics may be manifested to an observer as differences in color between the treated and untreated zones in reflected or transmitted light. The respective colors and the differences therebetween also typically change or shift with angle of incidence. The film 410 may have substantially the same film thickness in the zones 420, 422, 424, or the film thickness may vary somewhat between these zones, but any difference in film thickness between the zones is not primarily responsible for the differences between the first and second reflective characteristics. The zones 420, 422, 424 form a pattern that is internal or interior to the film, as indicated by the crosshatching in the stratum or layer 416. The crosshatching indicates that at least some of the microlayers in the crosshatched region have a reduced birefringence (including zero birefringence) compared to their birefringence in the zone 422 or in other untreated zones.

In an alternative interpretation of FIG. 4, element 416 may be a patternable retarder film. In such case, a first radiant beam may be used to change a first light retardation of element 416 to a second light retardation (e.g., zero retardation) in a pattern. The retardation in zone 422 may be the original retardation provided by retarder film 416, and the retardation in zones 420 and 424 may be the reduced retardation (including zero retardation) resulting from the thermal relaxation of the birefringent material that makes up the retarder film 416.

Figure 4A:
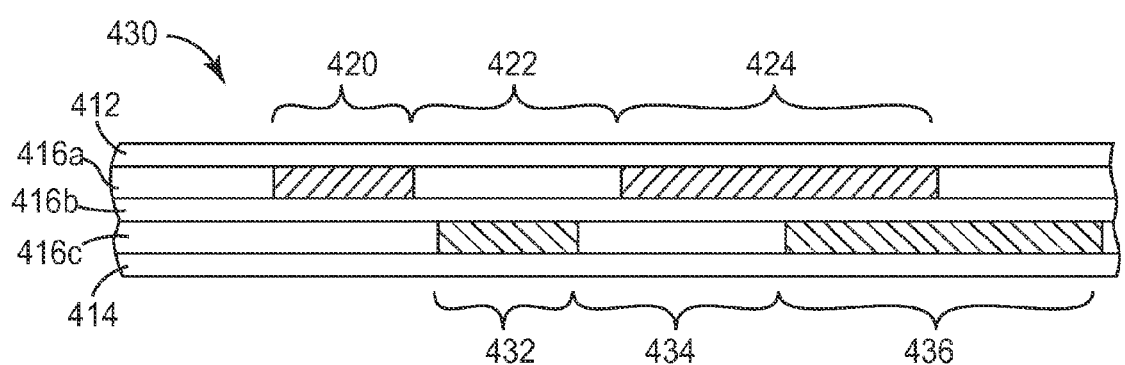
FIG. 4A is a schematic sectional view of a portion of another composite optical film with internal patterning, but where the internal patterning is accomplished independently in two levels of the film.

FIG. 4A is a schematic sectional view of a portion of another composite optical film 430 with internal patterning, but where the internal patterning is accomplished independently in two levels of the film. Certain components or elements of FIG. 4A have the same reference numerals as in FIG. 4, namely, skin layers 412, 414, and zones 420, 422, and 424, to indicate they are the same as or similar to the corresponding components of FIG. 4, which have already been discussed above and will not be repeated here. Furthermore, the stratum or layer 416 in FIG. 4 is replaced in FIG. 4A with three layers or strata 416 a-c to allow for bi-level patterning. Layer 416a may be identical to layer 416 of FIG. 4, with the same crosshatched regions again indicating reduced birefringence in layer 416a relative to uncrosshatched areas. We assume that layer 416a is a retarder film that has been patterned by a first radiant beam, with a first optical retardation in zone 422 and a reduced second optical retardation (including zero retardation) in zones 420, 424. Layer 416c may be a patternable reflective film containing a packet of microlayers. This layer 416c provides a first reflective characteristic in the uncrosshatched regions of layer 416c (e.g. zone 434) and a second reflective characteristic in the crosshatched regions (zones 432, 436).

The retarder film 416a preferably has an absorption characteristic that allows it to become absorptively heated, upon exposure to suitable directed light of a first radiant beam comprising a write wavelength, to an extent that the first optical retardation changes to the second optical retardation in portions of layer 416a exposed to such light (zones 420, 424). Likewise, the microlayer packet of layer 416c preferably has an absorption characteristic that allows it to become absorptively heated, upon exposure to suitably directed light of a second radiant beam which may also comprise the write wavelength, to an extent that the first reflective characteristic changes to the second reflective characteristic in portions of layer 416c exposed to such light (zones 432, 436). These absorption characteristics of either or both of layers 416a, 416c may be achieved by incorporating a suitable absorptive agent such as a dye or pigment into constituent layers thereof.

The bi-level patterned composite film 430 also preferably includes a blocking layer 416b disposed between the layers 416a, 416c. The blocking layer 416b blocks a sufficient amount of light at the write wavelength such that a first beam of light comprising the write wavelength can be directed at the zones 420, 424 of the film 430 to change the first optical retardation of layer 416a to the second optical retardation, while not changing the first reflective characteristic of layer 416c to the second reflective characteristic in such zones. The blocking layer 416b may also block a sufficient amount of light at the write wavelength such that a second beam of light comprising the write wavelength can be directed at the zones 432, 436 of the film 430 to change the first reflective characteristic of layer 416c to the second reflective characteristic, while not changing the first optical retardation of layer 416a to the second optical retardation in such zones. The blocking layer may achieve this functionality primarily by absorbing light at the write wavelength, by reflecting light at the write wavelength, or by a combination of absorbing and reflecting. Depending upon the design of the blocking layer and threshold characteristics of the respective writeable layers 416a, 416c, the first and second beams of light may be incident on the same side or major surface of the film 430, or they may be incident on opposite sides. In some designs, the first and second beams of light may also have different angles of incidence with respect to the film. For example, the first beam may be delivered at substantially normal incidence, and the second beam may be delivered at a large oblique angle relative to the film.

Another aspect of the blocking layer 416b that may be significant is the degree to which its in-plane properties are the same or different from each other. Stated another way, the blocking layer may have blocking characteristics that are independent, weakly dependent, or strongly dependent on the polarization state of the incident light. Stated yet another way, the blocking layer may be rotationally symmetric, or it may instead have varying degrees of rotational asymmetry, for rotations about the normal or z-axis. At one extreme, the blocking layer may be substantially rotationally symmetric about the z-axis, such that linearly polarized normally incident light at the write wavelength is blocked the same amount or to the same degree regardless of which in-plane axis of the blocking layer (e.g., the x-axis or the y-axis) the polarized light is aligned with. At another extreme, the blocking layer may be strongly rotationally asymmetric, such that linearly polarized normally incident light at the write wavelength is strongly blocked if aligned with one in-plane axis (e.g. the x-axis), and strongly transmitted if aligned with an orthogonal in-plane axis (e.g. the y-axis). Thus, the blocking layer may be or comprise a reflective polarizer or an absorptive polarizer, for example. In such a case the blocking layer may substantially block (by absorption or reflection) a first beam of light at the write wavelength and substantially transmit a second light beam at the write wavelength, where the first and second light beams may differ only in their polarization states and not in their angles of incidence. Such rotationally asymmetric blocking characteristics may also be limited to a particular reflection band of the electromagnetic spectrum, beyond which the blocking layer substantially transmits and does not block incident light of any polarization. Such reflection band may also shift with incident angle.

Regardless of the details of the blocking layer, at least two functional layers or films of the composite film 430 can be independently patterned or "written" using a single wavelength or wavelength band, referred to as a write wavelength, or they may be independently patterned using radiant beams having different write wavelengths. The patterns of the respective levels (e.g. zones 420, 424 for the level associated with layer 416a, and zones 432, 436 for the level associated with layer 416c) can be, from the standpoint of an observer or in plan view, for example, completely overlapping, completely non-overlapping, or partially overlapping as desired. The independent patterning can be facilitated by the blocking layer which at least partially blocks the write wavelength. Light of the write wavelength may be delivered by a laser, for example. The blocking layer can be absorbing or reflecting in such a manner that when the composite film is subjected to laser irradiation on one side of the blocking layer, insufficient optical power is delivered to the other side, and insufficient thermal conduction is likewise allowed, so that the writable film on the other side remains substantially intact and maintains at least a portion of its initial optical characteristic. A simple construction of a bi-level writeable composite film may thus comprise three layers or films, e.g. a laser-writable retardation film, a laser-writable reflective film (e.g. a multi-layer optical film, which may reflect only certain wavelengths or colors of light, or a diffusely reflective film), and an intervening blocking layer. A simple embodiment of the method may involve laser writing first on a first side of the film, thus modifying the optical properties (e.g. optical retardation) of only the film on this first side, and then laser writing on the opposite or second side of the composite film, thus modifying the optical properties (e.g. reflective properties) of only the film on this second side.

The blocking layer may be or comprise a multilayer reflective packet (whether rotationally symmetric or asymmetric) tuned to the laser wavelength (write wavelength) of interest. For example, the blocking layer may be or comprise a micro-layer packet having a reflection band at normal incidence that overlaps a laser write wavelength in the infrared (IR) portion of the spectrum. Alternatively, the blocking layer may be or comprise an internal layer that is loaded with an absorbing agent such as a dye or pigment that absorbs at the write wavelength. In this case, the first and/or second laser-writeable films may comprise some amount of the same absorbing agent, or some amount of a different absorbing agent.

Although IR wavelengths are often of particular utility to selectively heat the film during radiant processing, visible and ultraviolet (UV) wavelengths are also contemplated for the write wavelength. The blocking layer can thus be tailored for use in these ranges of the spectrum as well. Radiant beams that have different write wavelengths may be used to pattern the different functional layers or films of a composite film. For example, a first write wavelength may be an infrared optical wavelength, and a second write wavelength may be less than 700 nm. In another example, the first and second write wavelengths may be different infrared wavelengths, e.g., 808 nm and 1064 nm.

The blocking layer need not block all incident light at the write wavelength. Rather, the blocking layer, if included, need only block enough of the incident energy to prevent undesired processing or modification of the writeable films disposed behind the blocking layer from the standpoint of the incident beam. Typically, each writeable film has associated therewith a first or lower threshold energy level required to alter its birefringence enough so that the resulting modification to the initial optical characteristic of the film is noticeable or detectable, e.g., in reflected light, transmitted light, or polarized light. This lower threshold energy level is a function of the absorption characteristics of the given writable film. Likewise, each writeable film also typically has associated therewith a second or upper threshold energy value at or above which its birefringence is substantially completely removed, i.e., such that at least one of its constituent materials or layers become isotropic. For each writeable film, these lower and upper threshold energy levels can be related to threshold fluences and to the scan rate, e.g. for a laser processing system. For a given scan rate, it is convenient to consider beam intensities or fluences and designate these lower and upper thresholds $I_L$ and $I_U$, respectively.

In alternative embodiments to that of FIG. 4A, the bi-level writeable composite film may comprise not only two independently writeable optical films, but three or more. Such embodiments are still referred to as bi-level writeable multilayer optical films, since they include at least two independently writeable films. A separate blocking layer may be provided between each pair of adjacent or otherwise neighboring writeable films. For example, in reference to FIG. 4A, another writeable stratum or layer similar to layer 416c, and another blocking layer similar to blocking layer 416b, may be included between layer 416c and skin layer 414 or between layer 416a and skin layer 412. The various writeable films and blocking layers are tailored so that the films can be individually written or processed (i.e., selectively heated to reduce birefringence of individual materials thereof) with directed light beams that differ from each other in fluence, angle of incidence, side of incidence (i.e., whether the beam is incident from a top side or a bottom side of the composite film), and/or polarization, for example. Conveniently for manufacturing purposes, some combinations of writeable films and blocking layers allow at least three writeable films to be individually processed by three different directed light beams all of which are incident from the same side of the composite film and all of which comprise the same write wavelength.

Further discussion of angle-dependent and/or polarization-dependent writing or processing of composite films is provided below in connection with FIGS. 7, 7A, and 7B. First, however, we describe some specific examples of writeable optical films whose reflective characteristics can be modified in a patternwise fashion using selective absorptive heating delivered by any suitable directed beam. The various types of writeable optical films described can be combined as desired in a wide variety of combinations, along with suitable blocking layers one of which is preferably provided between each pair of adjacent or neighboring writeable films, to produce a wide variety of bi-level composite optical film constructions.

We thus turn our attention to the idealized graphs of FIGS. 5A-D. These graphs help to explain the process of patterning a multilayer optical film, and the process of patterning selected microlayer packets thereof in connection with bi-level patterning. They also help explain some of the different possible combinations of first and second reflective characteristics in the untreated and treated zones, respectively, for any given writeable packet of microlayers. For descriptive purposes, the reflective characteristic of a reflective film, whether in a treated or untreated zone, may be categorized into one of following three types: mirror-like reflective characteristics, window-like reflective characteristics, and polarizer-like reflective characteristics. A mirror-like reflective characteristic exhibits high reflectivity (e.g., in some cases greater than 50%, 60%, 70%, 80%, 90%, 95%, or 99%) for all polarization states of normally incident light, a window-like reflective characteristic exhibits low reflectivity (e.g., in some cases less than 20%, 10%, 5%, 3%, or 1%) for all polarization states of normally incident light, and a polarizer-like reflective characteristic exhibits high reflectivity (e.g., in some cases greater than 50%, 60%, 70%, 80%, 90%, 95%, or 99%) for normally incident light of one polarization state and low reflectivity (e.g., in some cases less than 30%, 20%, 10%, 5%, 3%, or 1%) for normally incident light of a different polarization state. (The reflective polarizer-like characteristic may alternatively be expressed in terms of the difference in reflectivity of one polarization state relative to the other polarization state.) The reflectivity values discussed herein that are associated with multilayer optical films or stacks should be considered to not include the Fresnel reflections at the outer air/polymer interfaces, unless otherwise indicated.

The boundaries or limits of these different characteristics—e.g., what is considered to be "high" reflectivity and what is considered to be "low" reflectivity—and the distinctions therebetween may depend on the end-use application and/or on system requirements. For example, a multilayer optical film, or a microlayer packet thereof, that exhibits moderate levels of reflectivity for all polarization states may be considered to be a mirror for purposes of some applications and a window for purposes of other applications. Similarly, a multilayer optical film, or a microlayer packet thereof, that provides moderately different levels of reflectivity for different polarization states of normally incident light may be considered to be a polarizer for some applications, a mirror for other applications, and a window for still other applications, depending on the exact reflectivity values and on the sensitivity of a given end-use application to differences in reflectivity for different polarization states. Unless otherwise indicated, the mirror, window, and polarizer categories are specified for normally incident light. The reader will understand that oblique-angle characteristics may in some cases be the same as or similar to, and in other cases may be drastically different from, the characteristics of an optical film at normal incidence.

In each of the graphs of FIGS. 5A-D, relative refractive index "n" is plotted on the vertical axis. On the horizontal axis, a position or mark is provided for each of the six refractive indices that characterize a two-layer optical repeat unit of a patternable multilayer optical film: "$1x$", "$1y$", and "$1z$" represent the refractive indices of the first layer along the x-, y-, and z-axes, which were referred to above as $n1x$, $n1y$, and $n1z$. Likewise, "$2x$", "$2y$", and "$2z$" represent the refractive indices of the second layer along the x-, y-, and z-axes, which were referred to above as $n2x$, $n2y$, and $n2z$. Diamond-shaped symbols ($\Diamond$) in the figures represent refractive indices of the materials in a first processing stage. This first stage may correspond to polymer layers that have been extruded and quenched or cast onto a casting wheel, for example, but that have not yet been stretched or otherwise oriented. Open (unfilled) circle-shaped symbols ($\bigcirc$) in the figures represent refractive indices of materials in a second stage of processing, later than the first stage. The second stage may correspond to polymer layers that have been stretched or otherwise oriented into a multilayer optical film that reflects light by constructive or destructive interference from interfaces between microlayers within the film. Small filled circle-shaped symbols or dots ($\bullet$) in the figures represent refractive indices of the materials in a third stage of processing, later than the first and second stages. The third stage may correspond to polymer layers that, after being extruded and oriented, have been selectively heat treated, as discussed elsewhere herein. Such heat treatment is typically limited to one or more particular portions or zones of a film, referred to as treated zones.

By comparing the vertical coordinates of the various symbols in a given figure, the reader can readily ascertain a great deal of information about the multilayer optical film, its method of manufacture, and the optical properties of its treated and untreated portions. For example, the reader can ascertain: if one or both material layers are or were birefringent before or after the selective heat treatment, and whether the birefringence is uniaxial or biaxial, and whether the birefringence is large or small. The reader can also ascertain from FIGS. 5A-D relative magnitudes of each of the refractive index differences $\Delta nx$, $\Delta ny$, $\Delta nz$ between the two layers, for each of the three processing stages (cast state, stretched state, and treated state).

As discussed above, a precursor article to the finished, internally patterned multilayer optical film can be a cast web of polymer material. The cast web may have the same number of layers as the finished film, and the layers may be composed of the same polymer materials as those used in the finished film, but the cast web is thicker and its layers are usually all isotropic. In some cases, however, not depicted in the figures, the casting process may itself impart a level of orientation and birefringence in one or more of the materials. The diamond-shaped symbols in FIGS. 5A-D represent the refractive indices of the two polymer layers in the cast web that, after a subsequent stretching procedure, become the microlayers in the optical repeat units of the multilayer optical film. After stretching, at least some of the layers become oriented and birefringent, and an oriented (but still unpatterned) multilayer optical film is formed. This is exemplified in FIGS. 5A-D by open circles that may be vertically displaced from their respective original values represented by the diamond-shaped symbols. For example, in FIG. 5A, the stretching procedure raises the refractive index of the second layer along the x-axis, but lowers its refractive index along the y- and z-axis. Such a refractive index shift may be obtained by suitably uniaxially stretching a positively birefringent polymer layer along the x-axis while allowing the film to dimensionally relax along the y- and z-axes. In FIG. 5B, the stretching procedure raises the refractive index of the first layer along the x- and y-axes, but lowers its refractive index along the z-axis. Such a refractive index shift may be obtained by suitably biaxially stretching a positively birefringent polymer layer along the x- and y-axes. In FIG. 5C, the stretching procedure raises the refractive index of both the first and second layers along the x-axis, lowers their respective refractive index along the z-axis, and maintains about the same refractive index along the y-axis. In some cases, this refractive index shift may be obtained by biaxially stretching a positively birefringent polymer layer asymmetrically along the x- and y-axes, using a higher degree of stretch along the x-axis compared to the y-axis. In other cases, this may be approximately obtained by uniaxially stretching along an x-axis while constraining the film in the y-axis (constrained uniaxial stretching). Note that in FIGS. 5A and 5B, one of the layers in the oriented but untreated state (open circles) is birefringent because at least two of the open circles (for $n2x$, $n2y$, and $n2z$ in FIG. 5A, and for $n1x$, $n1y$, and $n1z$ in FIG. 5B) have different values of refractive index n. In these depicted embodiments, the other polymer layer remains isotropic after stretching as indicated by the same refractive index values ($n1x=n1y=n1z$ in FIG. 5A, and $n2x=n2y=n2z$ in FIG. 5B) for the cast state and for the oriented but untreated state.

After formation of the at least partially birefringent multilayer optical film having the microlayers arranged into optical repeat units to provide the first reflective characteristic, the film is ready for the selective heating discussed above. The heating is carried out selectively in a second zone which neighbors a first zone of the multilayer optical film, and is tailored to selectively melt and disorient in part or in whole at least one birefringent material in the microlayer packet in order to reduce or eliminate the birefringence in at least some of the microlayers while leaving their birefringence unchanged in the first (untreated) zone. The selective heating is also carried out to maintain the structural integrity of the layers in the second zone. If the birefringent material in the treated second zone is disoriented in whole, i.e., completely, then the birefringent microlayers return to the isotropic state (e.g. of the cast web), while remaining optically thin. This can be seen in FIGS. 5A and 5B, where heat treatment causes the refractive indices of the first layer (FIG. 5B) or second layer (FIG. 5A) (see the small dark dots) to revert to their values in the cast web state (see the diamond-shaped symbols). Recall that the diamond-shaped symbols represent the refractive indices of layers in the isotropic state (e.g., the cast web), the small dark dots represent the refractive indices of microlayers in the treated or selectively heated zones in the finished, internally patterned film, and the open circles represent the refractive indices of microlayers in untreated zones of the finished, internally patterned film.

If the birefringent material in the treated second zone is disoriented only in part, i.e., incompletely, then the birefringent microlayers relax to a state of birefringence that is less than the birefringent state before heating but is not isotropic. In this case, the refractive indices of the birefringent material in the treated second zone acquire values somewhere between the diamond-shaped symbols and the open circles shown in FIGS. 5A-D. Some examples of such incomplete birefringent relaxation are explained in more detail in commonly assigned PCT Publication WO 2010/075363 (Merrill et al.), "Internally Patterned Multilayer Optical Films With Multiple Birefringent Layers", incorporated herein by reference.

Figure 5A:
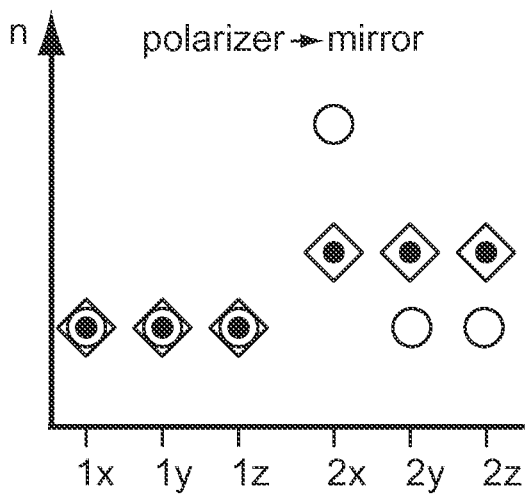
FIGS. 5A-D are idealized plots showing each refractive index (nx, ny, nz) of two alternating microlayers of a microlayer packet, or of two distinct polymer materials of a blended layer, for different stages of manufacture of various reflective STOF films.
Figure 5B:
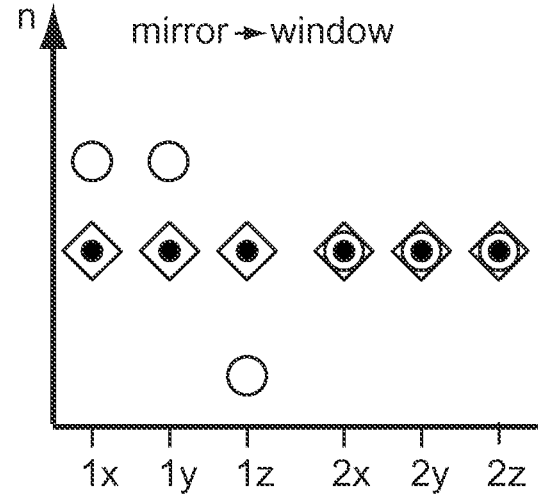
Figure 5C:
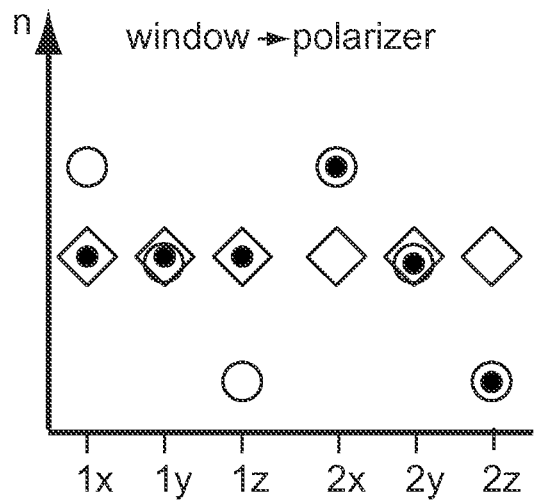

In FIG. 5A, a first polymer material is selected that has a relatively low refractive index, and a second polymer material is selected that has a higher refractive index and that has a positive stress-optic coefficient. The materials are coextruded in an alternating layer arrangement with a suitable number of layers to form a multilayer cast web, having indices shown by the diamond-shaped symbols. The cast web is then uniaxially stretched along the x-axis under suitable conditions to induce birefringence in the second polymer material while the first polymer material remains isotropic. The refractive index value $n2x$ increases further to form a large index difference $\Delta nx$ with $n1x$. The refractive index values $n2y$ and $n2z$ decrease to form small index differences $\Delta ny$ and $\Delta nz$ with $n1y$ and $n1z$ respectively. The values $\Delta ny$ and $\Delta nz$ may be zero, for example. This set of refractive indices, when implemented in a microlayer packet with an adequate number of layers, can provide a reflective polarizer with the x-axis being a block axis and the y-axis being a pass axis. The reflective polarizer may be broad band or narrow band, depending on the layer thickness distribution of the microlayers.

This reflective polarizing film can then be internally patterned in a second zone as described above, while leaving the reflective polarizing film intact in a first zone. Selective heating by selective delivery of radiant energy to the second zone causes the birefringent layers to relax to their original isotropic states, or to an intermediate birefringent state if the disorientation is incomplete. If relaxation is complete, the second zone can become a mirror-like film (if the microlayer packet has an adequate number of layers) with $\Delta nx \approx \Delta ny \approx \Delta nz$. The finished film thus combines in a unitary film a reflective polarizer in one zone and a mirror-like film in a neighboring zone, with microlayers that extend continuously from one zone to the next. Such films are described more fully in copending and commonly assigned PCT Publication WO 2010/075340 (Merrill et al.), "Multilayer Optical Films Having Side-by-Side Mirror/Polarizer Zones". For FIG. 5A, the selective heat treatment process is able to change a multilayer reflective polarizer film to a multilayer reflective mirror film, i.e.: polarizer→mirror.

In FIG. 5B, first and second polymer materials are selected that have substantially the same refractive index, but where the first polymer material has a positive stress-optic coefficient. The materials are coextruded in an alternating layer arrangement with a suitable number of layers to form a multilayer cast web, having indices shown by the diamond-shaped symbols. The cast web is then biaxially stretched along the x- and y-axes under suitable conditions to induce birefringence in the first polymer material while the second polymer material remains isotropic. The refractive index values $n1x$, $n1y$ increase to form substantial refractive index differences $\Delta nx$, $\Delta ny$ with $n2x$, $n2y$ respectively. The refractive index value $n1z$ decreases to form a substantial refractive index difference $\Delta nz$ with $n2z$ that is opposite in polarity or sign to $\Delta nx$ and $\Delta ny$. This set of refractive indices, when implemented in a microlayer packet with an adequate number of layers, can provide a mirror-like film. The reflection provided by the film may be broad band or narrow band, depending on the layer thickness distribution of the microlayers.

This mirror-like film can then be internally patterned in a second zone as described above, while leaving the mirror-like film intact in a first zone. Selective heating by selective delivery of radiant energy to the second zone causes the birefringent layers to relax to their original isotropic states, or to an intermediate birefringent state if the disorientation is incomplete. If relaxation is complete, the second zone becomes a window-like film with $\Delta nx \approx \Delta ny \approx \Delta nz \approx 0$. The finished film thus combines in a unitary film a mirror-like reflector in one zone and a substantial window in a neighboring zone, with microlayers that extend continuously from one zone to the next. For this FIG. 5B, the selective heat treatment process is able to change a multilayer reflective mirror film to a multilayer window film (mirror→window).

In both FIGS. 5A and 5B, one of the optical materials remains isotropic after stretching (and after the selective heat treatment). This, however, need not be the case in general, and many interesting and useful multilayer optical film designs, as well as diffusely reflective film designs, that can be converted into internally patterned optical films using the selective heat treatment techniques disclosed herein comprise two different optical materials for the constituent layers of the optical repeat unit, and both (rather than only one) of these constituent material layers become birefringent when the cast web is stretched or otherwise oriented. Such multilayer optical films and diffusely reflective optical films are referred to herein as "doubly birefringent" optical films, since, in the case of multilayer optical films, optical repeat units in such a film each include at least two constituent microlayers that are birefringent after stretching, and in the case of diffusely reflective films, a blended layer in such a film includes at least two different materials that form two distinct phases, and both of the phases are birefringent after stretching.

When a doubly birefringent multilayer optical film is exposed to the selective heat treatment, a number of different responses are possible in the treated zone depending on the material properties and the heating conditions: both material layers may completely relax to become isotropic, or one material layer may relax completely or partially while the other material layer maintains its birefringence, or both material layers may relax by different amounts (e.g., one material layer may relax completely to become isotropic, while the other material relaxes partially so as to maintain only a portion of its birefringence), for example. In any case, the change in birefringence of one or both material layers results in a reflective characteristic in the second (treated) zone of the optical film that differs substantially from a reflective characteristic in the first (untreated) zone of the film. Further details of doubly birefringent multilayer optical films, and selective heating techniques used to internally pattern them, are provided in the following commonly assigned PCT publications, which are incorporated herein by reference: WO 2010/075363 (Merrill et al.), "Internally Patterned Multilayer Optical Films With Multiple Birefringent Layers"; and WO 2010/075383 (Merrill et al.), "Multilayer Optical Films Having Side-by-Side Polarizer/Polarizer Zones". Some examples of doubly birefringent multilayer optical films suitable for internal patterning by selective heat treatment are shown in the present application in FIGS. 5C and 5D.

In FIG. 5C, first and second polymer materials are selected that have the same or similar isotropic refractive indices, and that have the same or similar stress-optic coefficients (shown as positive in FIG. 5C although negative coefficients may also be used), and that have different melting or softening temperatures. The materials are coextruded in an alternating layer arrangement with a suitable number of layers to form a multilayer cast web, having indices shown by the diamond-shaped symbols. Rather than being biaxially drawn, the cast web of FIG. 5C is then uniaxially stretched along the x-axis under suitable conditions to induce birefringence in both the first and second polymer materials. The stretching causes the refractive index values $n1x$ and $n2x$ to increase by similar amounts, while causing $n1z$ and $n2z$ to decrease by similar amounts, and while causing $n1y$ and $n2y$ to remain relatively constant. This results in refractive indices of the two material layers that are substantially matched along all three principal directions ($\Delta nx \approx 0$, $\Delta ny \approx 0$, and $\Delta nz \approx 0$), even though each material layer is strongly biaxially birefringent. This set of refractive indices, when implemented in a microlayer packet with an adequate number of layers, can provide a multilayer window-like film that has little or no reflectivity for normally incident and obliquely incident light.

This multilayer window film can then be internally patterned in a second zone as described above, while leaving the window film intact in a first zone. Selective heating by selective delivery of radiant energy to the second zone causes at least some of the birefringent layers to relax, becoming less birefringent. In the case of FIG. 5C, the heating is again carefully controlled to a temperature that is above the melting or softening point of the first material layers, but below the melting or softening point of the second material layers. In this way, the selective heating causes the first birefringent layers in the second zone to relax to their original isotropic states, or to an intermediate birefringent state if the disorientation is incomplete, while causing the second birefringent layers in the second zone to substantially maintain their birefringence. If relaxation of the first material is complete, the second zone is characterized by a relatively large refractive index difference ($\Delta nx$) in one in-plane direction, a zero or near-zero refractive index difference ($\Delta ny$) in the other in-plane direction, and a relatively large out-of-plane refractive index difference ($\Delta nz$) of opposite polarity or sign compared to $\Delta nx$. These refractive index relationships, when implemented in a microlayer packet with an adequate number of layers, can provide a reflective polarizer film in the second zone. This polarizer film has a pass axis parallel to the y-direction and a block axis parallel to the x-direction. The reflection provided by this film for block-state polarized light may be broad band or narrow band, depending on the layer thickness distribution of the microlayers. In either case, the reflectivity of the polarizer film for block-state polarized light (for both the s-polarized component and the p-polarized component) increases with increasing incidence angle due to the opposite polarity of $\Delta nz$. The finished film thus combines in a unitary film a multilayer window film in one zone and a reflective polarizer film in a neighboring zone, with microlayers that extend continuously from one zone to the next. For this FIG. 5C, the selective heat treatment process is able to change a multilayer window film to a multilayer reflective polarizer film (window→polarizer).

Figure 5D:
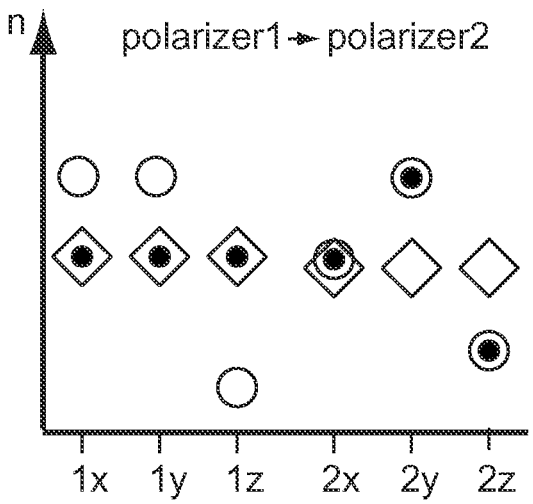

The embodiment of FIG. 5D makes use of a two-step drawing process that is described in U.S. Pat. No. 6,179,948 (Merrill et al.). In this process, the stretching or orientation of the cast film is carried out using a two-step drawing process that is carefully controlled so that one set of layers (e.g., the first material layer of each optical repeat unit) substantially orients during both drawing steps, while the other set of layers (e.g., the second material layer of each optical repeat unit) only substantially orients during one drawing step. The result is a multilayer optical film having one set of material layers that are substantially biaxially oriented after drawing, and having another set of material layers that are substantially uniaxially oriented after drawing. The differentiation is accomplished by leveraging the different visco-elastic and crystallization characteristics of the two materials by using one or more suitably different process conditions such as temperature, strain rate, and strain extent for the two process drawing steps. Thus, for example, a first drawing step may substantially orient the first material along a first direction while at most only slightly orienting the second material along this direction. After the first drawing step, one or more process conditions are suitable changed such that in a second drawing step, both the first and the second materials are substantially oriented along a second direction. Through this method, the first material layers can assume an essentially biaxially-oriented character (for example, the refractive indices may satisfy the relationship $n1x \approx n1y \neq n1z$, sometimes referred to as a uniaxially birefringent material), while the second material layers in the very same multilayer film can assume an essentially uniaxially-oriented character (for example, the refractive indices may satisfy the relationship $n2x \neq n2y \neq n2z \neq n2x$, sometimes referred to as a biaxially birefringent material).

With this background, FIG. 5D depicts an embodiment in which the first and second polymer materials are selected to have the same or similar isotropic refractive indices, and to both become birefringent after drawing, and to have the same polarity of stress-optic coefficient (in the drawing they are both depicted as positive, but they can instead both be negative). The first and second materials have different melting or softening temperatures, and have different visco-elastic and/or crystallization characteristics such that the two-step drawing process discussed above can be implemented. The materials are coextruded in an alternating layer arrangement with a suitable number of layers to form a multilayer cast web, having indices shown by the diamond-shaped symbols. The cast web is then biaxially stretched along the x- and y-axes using the above-described two-step drawing process, such that the first material is oriented comparably along both the x- and y-axes, whereas the second material is oriented preferentially along the y-axis, with lesser orientation (including in some cases no orientation) along the x-axis. The net result is a multilayer optical film whose first and second microlayers are both birefringent, but the first material layers have a substantially biaxially-oriented character, whereas the second material layers have an asymmetric biaxially-oriented character, or even a substantially uniaxially-oriented character. As shown, the materials and process conditions are selected so that the stretching causes the refractive index values $n1x$ and $n1y$ to increase by similar amounts, while causing $n1z$ to decrease by a larger amount. The stretching also causes the refractive index value $n2y$ to increase to a value equal to or close to that of $n1x$ and $n1y$, and causes the refractive index $n2z$ to decrease, and causes the refractive index $n2x$ to remain about the same (if the second material orients to a small degree during the x-axis orientation step, then $n2x$ may increase slightly as shown in the figure). This results in refractive indices of the two material layers that have one large in-plane refractive index mismatch ($\Delta nx$), one significantly smaller in-plane refractive index mismatch ($\Delta ny \approx 0$), and an intermediate out-of-plane refractive index mismatch ($\Delta nz$) of opposite polarity from $\Delta nx$. When the second material orients more biaxially, index matching in the x-direction after treatment may be achieved by pairing with a first material whose isotropic index is higher than the second. This set of refractive indices, when implemented in a microlayer packet with an adequate number of layers, can provide a first reflective polarizing film with a block axis along the x-direction and a pass axis along the y-direction. The reflection provided by the film (for light polarized parallel to the block axis) may be broad band or narrow band, depending on the layer thickness distribution of the microlayers.

This first multilayer reflective polarizer film can then be internally patterned in a second zone as described above, while leaving the polarizer film intact in a first zone. Selective heating by selective delivery of radiant energy to the second zone causes at least some of the birefringent layers to relax, becoming less birefringent. In the present case, the heating is carefully controlled to a temperature that is above the melting or softening point of the first material layers, but below the melting or softening point of the second material layers. In this way, the selective heating causes the first birefringent layers in the second zone to relax to their original isotropic states, or to an intermediate birefringent state if the disorientation is incomplete, while causing the second birefringent layers in the second zone to substantially maintain their birefringence. If relaxation of the first material is complete, the second zone is characterized by a relatively large refractive index difference ($\Delta ny$) in one in-plane direction, a zero or near-zero refractive index difference ($\Delta nx$) in the other in-plane direction, and a relatively large out-of-plane refractive index difference ($\Delta nz$) of opposite polarity or sign compared to $\Delta ny$. These refractive index relationships, when implemented in a microlayer packet with an adequate number of layers, can provide a second reflective polarizer film in the second zone. Notably, this second polarizer has a pass axis parallel to the x-direction and a block axis parallel to the y-direction, i.e., it is perpendicularly oriented relative to the first reflective polarizer. The reflection provided by this second polarizer film for block-state polarized light will be broad band or narrow band, depending on the layer thickness distribution of the microlayers, to the same extent that the first reflective polarizer is broad band or narrow band for the orthogonal polarization state. In any case, the reflectivity of the second polarizer film for block-state polarized light (for both the s-polarized component and the p-polarized component) increases with increasing incidence angle due to the opposite polarity of $\Delta nz$ in the second zone. The finished film thus combines in a unitary film a first reflective polarizer film in one zone and a second reflective polarizer film in a neighboring zone, the second reflective polarizer film being oriented perpendicular to the first reflective polarizer film, with microlayers that extend continuously from one zone to the next. For this FIG. 5D, the selective heat treatment process is able to change a first multilayer reflective polarizer film to a second multilayer reflective polarizer film (polarizer1→polarizer2).

The scenarios discussed above involve only some of a multitude of possible combinations of reflector types for the first zone, reflector types for the second zone, material characteristics, and processing parameters that can be used to produce other internally patterned multilayer optical films, and should not be considered to be limiting. Note that not just positively birefringent but also negatively birefringent materials, and combinations thereof, can be used. Note also that in cases where the combination of a birefringent and isotropic polymer is used, the birefringent polymer may have a pre-stretch isotropic index that is less than, greater than, or equal to the refractive index of the isotropic polymer. Discussion of other possible combinations of reflector types for the first and second zones of internally patterned multilayer optical films, which various combinations can be utilized in bi-level writeable multilayer optical films as disclosed herein, can be found in one or more of the following commonly assigned PCT publications: WO 2010/075357 (Merrill et al.), "Internally Patterned Multilayer Optical Films Using Spatially Selective Birefringence Reduction"; WO 2010/075340 (Merrill et al.), "Multilayer Optical Films Having Side-by-Side Mirror/Polarizer Zones"; WO 2010/075363 (Merrill et al.), "Internally Patterned Multilayer Optical Films With Multiple Birefringent Layers"; and WO 2010/075383 (Merrill et al.), "Multilayer Optical Films Having Side-by-Side Polarizer/Polarizer Zones".

Figure 6:
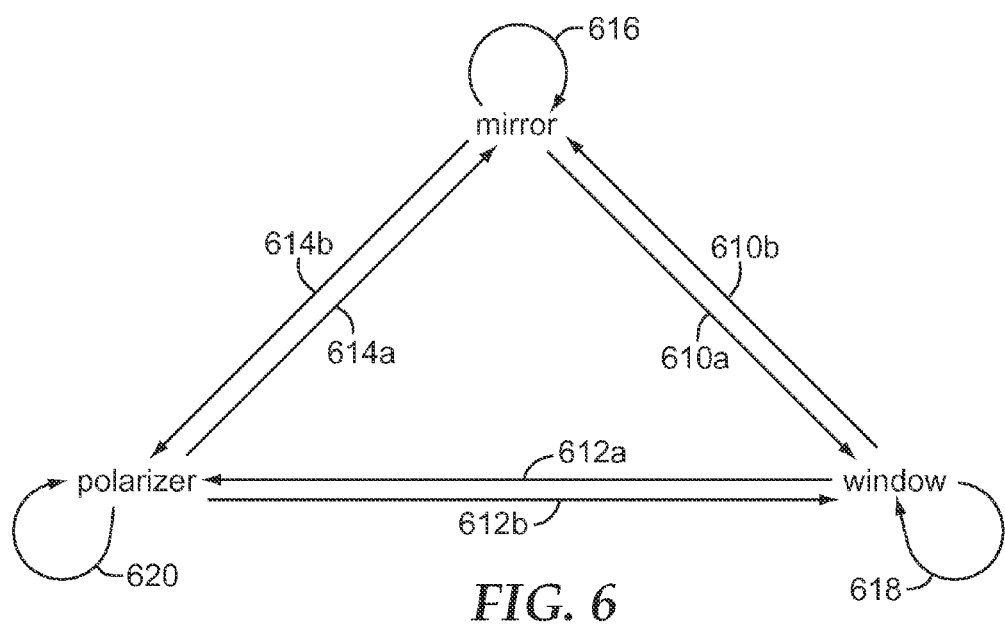
FIG. 6 is a schematic diagram that summarizes various transformations that can be achieved using the techniques discussed herein for reflective STOF films.

FIG. 6 is a schematic diagram that summarizes various transformations that can be achieved using the birefringent-relaxation techniques discussed herein for multilayer optical films. As such, the diagram also summarizes a variety of combinations of reflector types for the first (untreated) zone and the second (heat treated) zone of an internally patterned multilayer optical film, which in turn may form part of a bi-level writeable composite film, which may also comprise one or more patternable retarder films. The arrows in the figure represent transformations from a first reflective characteristic to a second reflective characteristic that differs substantially from the first reflective characteristic. Note that the diagram of FIG. 6 is provided for illustrative purposes and should not be construed as limiting.

Arrow 610a represents a transformation from a multilayer mirror film to a multilayer window film, e.g., as described in connection with FIG. 5B. Such a transformation can be used to provide an internally patterned multilayer optical film with one or more first (untreated) zones characterized by a mirror film and one or more second (treated) zones characterized by a window film. Arrow 610b represents an opposite transformation, from a multilayer window film to a multilayer mirror film. Such a transformation can be used to provide an internally patterned multilayer optical film with one or more first (untreated) zones characterized by a window film and one or more second (treated) zones characterized by a mirror film.

Arrow 612a represents a transformation from a multilayer window film to a multilayer polarizer film, e.g., as described in connection with FIG. 5C. Such a transformation can be used to provide an internally patterned multilayer optical film with one or more first (untreated) zones characterized by a window film and one or more second (treated) zones characterized by a polarizer film. Arrow 612b represents an opposite transformation, from a multilayer polarizer film to a multilayer window film. Such a transformation can be used to provide an internally patterned multilayer optical film with one or more first (untreated) zones characterized by a polarizer film and one or more second (treated) zones characterized by a window film.

Arrow 614a represents a transformation from a multilayer polarizer film to a multilayer mirror film, e.g., as described in connection with FIG. 5A. Such a transformation can be used to provide an internally patterned multilayer optical film with one or more first (untreated) zones characterized by a polarizer film and one or more second (treated) zones characterized by a mirror film. Arrow 614b represents an opposite transformation, from a multilayer mirror film to a multilayer polarizer film. Such a transformation can be used to provide an internally patterned multilayer optical film with one or more first (untreated) zones characterized by a polarizer film and one or more second (treated) zones characterized by a window film.

Arrows 616, 618, and 620 represent transformations from one type of mirror to another type of mirror, from one type of window to another type of window, and from one type of polarizer to another type of polarizer (see e.g. FIG. 5D). The reader is again reminded that the diagram of FIG. 6 is provided for illustrative purposes and should not be construed in a limiting fashion.

FIGS. 5A-D and 6 and their associated descriptions are primarily directed to reflective films whose reflective characteristics are determined in large part by constructive and destructive interference of light reflected from interfaces between microlayers disposed within the film, i.e., multilayer optical films. Counterparts to those figures and descriptions can also be provided for reflective films whose reflective characteristics are diffuse in nature because they are determined in large part by first and second materials that are separated into distinct first and second phases in one or more blended layer. Reference in this regard is made to commonly assigned U.S. Application Ser. No. 61/360,124, "Diffuse Reflective Optical Films With Spatially Selective Birefringence Reduction", filed Jun. 30, 2010. For each of FIGS. 5A-D, the "first" material may be considered to be a continuous phase and the "second" material may be considered to be a dispersed phase (or another continuous phase), while in an alternative embodiment, the "second" material may be considered to be a continuous phase and the "first" material may be considered to be a dispersed phase (or another continuous phase).

The fact that the change in the reflective or other optical characteristic of the STOF film is associated primarily with heat-induced relaxation in birefringence of a material or layer of the STOF film means that the selective treatment process used to pattern the STOF film may be primarily one-way or irreversible. For example, a given area or zone of the STOF film that has been processed (selectively heat treated by absorption of radiant energy) so that its initial first reflection characteristic has been changed to a second reflection characteristic may thereafter not be able to be processed with another radiant beam to re-acquire its original first reflection characteristic. In fact, if the initial heat treatment substantially eliminated birefringence in the zone, then further radiant treatment with the same or similar radiant beam may have little or no additional effect on the reflective characteristic of the zone. This one-way or irreversible aspect of STOF film patterning may be particularly advantageous e.g. in security applications where, for example, tamper-resistance is important, or in display or opto-electronic applications where for example stability to optical or electronic fields, used to switch other component elements, is desired. In other applications, this one-way or irreversible aspect of STOF film patterning in a continuous phase may be combined with switchable elements in another phase, e.g. in opto-electronic devices where for example a stable, patterned continuous phase with birefringence in a first zone and little or no birefringence in a second zone is desired.

Figure 7:
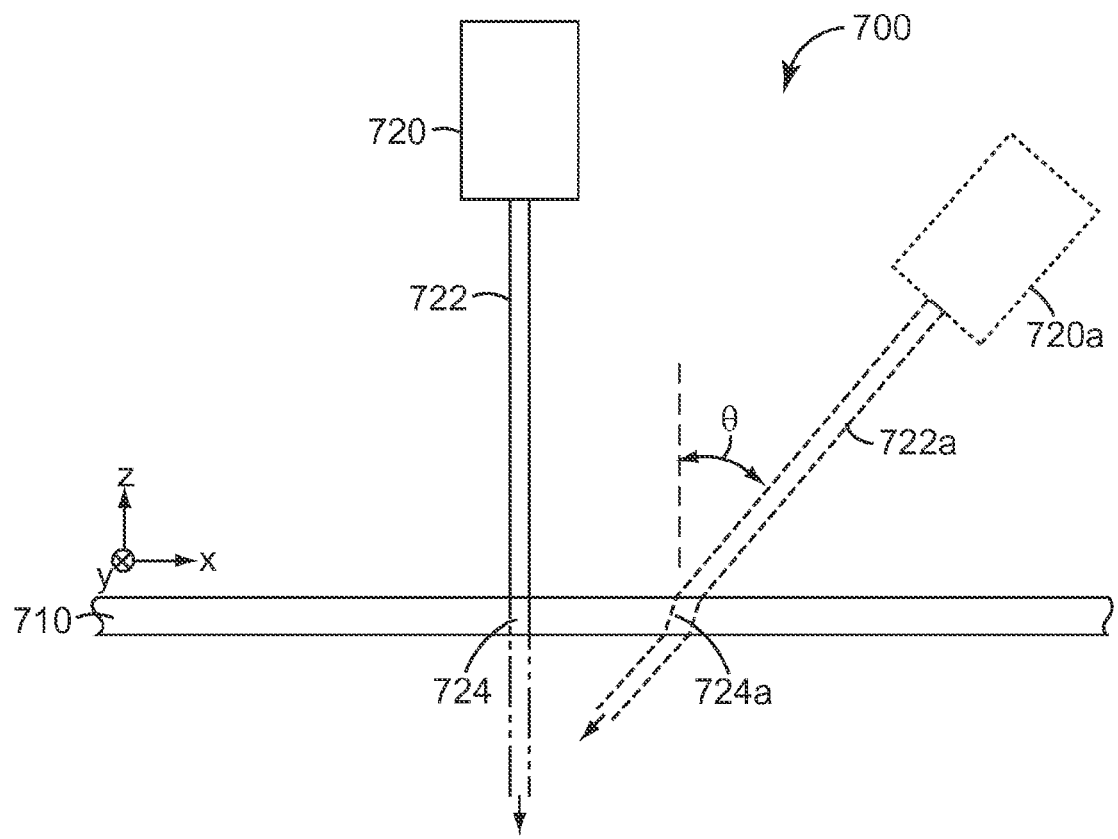
FIG. 7 is a schematic side view of an arrangement for selectively heating a composite film to accomplish internal patterning.

In FIG. 7, we show one arrangement 700 that can be used to selectively heat the second zone of the composite films to provide the disclosed patterned (e.g. internally patterned) films. Briefly, a composite film 710 is provided that comprises at least one patternable retarder film and at least one other patternable optical film (e.g. another retarder film and/or a reflective film) that extend in a layered arrangement throughout the film, or at least from a first to a second zone thereof. One or more of the individual patternable films may be internal to the composite film, and each provides a respective optical characteristic that combine at any given location on the useable area of the composite film to provide a first composite optical characteristic at that location. A high radiance light source 720 provides a directed beam 722 of suitable wavelength, intensity, and beam size to selectively heat an illuminated portion 724 of the composite film by converting some of the incident light to heat by absorption. Preferably, the absorption of the film is great enough to provide sufficient heating with a reasonably-powered light source, but not so high that an excessive amount of light is absorbed at the initial surface of the film, which may cause surface damage. This is discussed further below. In some cases it may be desirable to orient the light source at an oblique angle θ, as shown by the obliquely positioned light source 720a, directed beam 722a, and illuminated portion 724a. Such oblique illumination may be desirable where the composite film 710 contains a microlayer packet having a reflection band at normal incidence that substantially reflects the directed beam 722 in a way that prevents the desired amount of absorption and concomitant heating. Thus, taking advantage of the shift of the reflection band to shorter wavelengths with increasing incidence angle, the directed beam 722a can be delivered at an oblique angle θ that avoids the (now shifted) reflection band to allow the desired absorption and heating.

Oblique illumination may also be desirable where the composite film contains a diffusely reflective film, and where the diffuse reflectivity changes with incidence angle and/or polarization state. At one incident angle and polarization state, for example, the diffuse film may scatter the directed beam 722/722a to a great extent in a way that prevents the desired amount of absorption and concomitant heating of the blended layer in the second zone. At a different incident angle and/or polarization state, the scattering may be substantially reduced so as to allow the desired amount of absorption and concomitant heating of the blended layer in the second zone to produce the birefringence relaxation and reflectivity transformations discussed above. Thus, the angle of incidence θ and the polarization state of the directed beam 722/722a can be selected to avoid excessive scattering of the blended layer, e.g., they be selected to coincide with a minimum scattering of the blended layer or optical film. If the diffusely reflective film is a reflective polarizer, the polarization state may be a pass state of the polarizer.

In some cases, the directed beam 722 or 722a may be shaped in such a way that the illuminated portion 724 or 724a has the desired shape of the finished second zone. In other cases, the directed beam may have a shape that is smaller in size than the desired second zone. In the latter situation, beam steering equipment can be used to scan the directed beam over the surface of the multilayer optical film so as to trace out the desired shape of the zone to be treated. Spatial and temporal modulation of the directed beam can also be utilized with devices such as beam splitters, lens arrays, pockels cells, acousto-optic modulators, and other techniques and devices known to those of ordinary skill in the art.

Figure 7A:
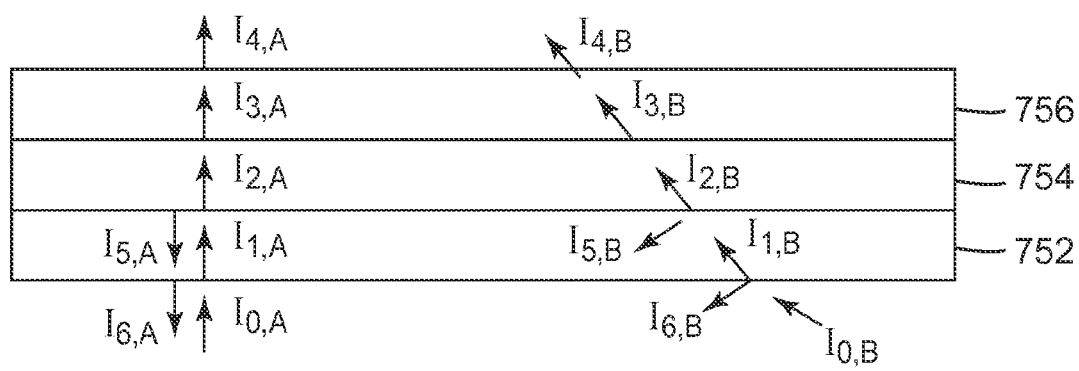
FIG. 7A is a side view of a composite film that has been specifically designed to allow independent processing or patterning of at least two of its constituent optical films, i.e., it has been designed for bi-level internal patterning.

FIG. 7A is a side view of a composite film 750 that has been specifically designed to allow independent processing or patterning of at least two of its constituent optical films, i.e., it has been designed for bi-level internal patterning, similar to the films described in connection with FIG. 4A. In the case of film 750, normally incident light of the write wavelength, and of suitable intensity or fluence (denoted in FIG. 7A by subscript "A"), is used to treat or pattern a first optical film 752, e.g., a retarder film, without substantially treating or patterning a second optical film 756, e.g., a specular or diffuse reflective film. Obliquely incident light of the write wavelength, and of suitable fluence (denoted in FIG. 7A by subscript "B"), is used to treat or pattern the second film 756 without substantially treating or patterning the first film 752.

Thus, in FIG. 7A, normally incident radiant energy $I_{0,A}$ impinges on the first writable film 752. This radiant energy $I_{0,A}$ may be linearly polarized or it may be unpolarized, as desired. Some of the energy $I_{6,A}$ is reflected from the first outer surface, resulting in a lower energy $I_{1,A}$ entering the first film 752. Absorption and optionally some reflection from film 752 at the write wavelength results in an even lower energy $I_{2,A}$ of normally incident light exiting the film 752. A blocking layer 754 may be or include a microlayer packet that substantially reflects the impinging light of energy $I_{2,A}$, resulting in reflected beam $I_{5,A}$. Note that this microlayer packet may be rotationally symmetric or asymmetric as discussed above, which determines if the microlayer packet is a substantial mirror or polarizer. If the blocking layer 754 is a substantial polarizer, then it may (in some cases) be desirable to tailor the radiant energy $I_{0,A}$ (and the energy $I_{1,A}$ and $I_{2,A}$) to be linearly polarized along the block axis of such polarizer. Otherwise, e.g., if the blocking layer 754 is a substantial mirror, then the radiant energy $I_{0,A}$ (and energy $I_{1,A}$ and $I_{2,A}$) may be either polarized or unpolarized, which may or may not have an effect on the selective heating operations depending on the design of the individual optical films. Residual intensities entering and exiting the second film 756, represented in the figure as $I_{3,A}$ and $I_{4,A}$, respectively, are sufficiently reduced to limit processing, e.g. reduction of birefringence, of the second writeable film 756 to a desired level. When blocking layer 754 is sufficiently strong for a chosen initial impingement energy, $I_{0,A}$, then these residual intensities are both below the lower threshold $I_{L,2}$ and no significant reduction of birefringence occurs in the second film 756.

For the obliquely incident light beam, radiant energy $I_{0,B}$ impinges on the first writable film 752. This radiant energy $I_{0,B}$ may be linearly polarized or it may be unpolarized, in accordance with the discussion above. Some of the energy $I_{6,B}$ is reflected from the first outer surface resulting in a lesser energy $I_{1,B}$ entering the first film 752. It may be advantageous to orient the laser polarization so that p-polarization light is delivered, and obliquely processed near the Brewster angle to limit reflection losses from the outer surface. The entering energy intensity $I_{1,B}$ is sufficiently low so that the changes in the first film are kept to a low enough level to maintain birefringence in the first film at a desired level. Complete independent manipulation of the two writeable films is possible when $I_{1,B}$ is lower than $I_{L,1}$. The oblique angle is chosen so that the reflection band of the blocking layer 754 has shifted to substantially avoid the write wavelength, allowing substantial passage of entering beam $I_{2,B}$ through the blocking layer 754 while providing at most only a very weak reflected beam $I_{5,B}$. Thus beam $I_{3,B}$ enters the second film 756 at sufficient strength to obtain the desired level of processing and exiting beam $I_{4,B}$ is still of sufficient strength to process the back or distal portions of the second film 756. For complete elimination of birefringence in the second film, $I_{4,B}$ should be at least about $I_{U,2}$.

Figure 7B:
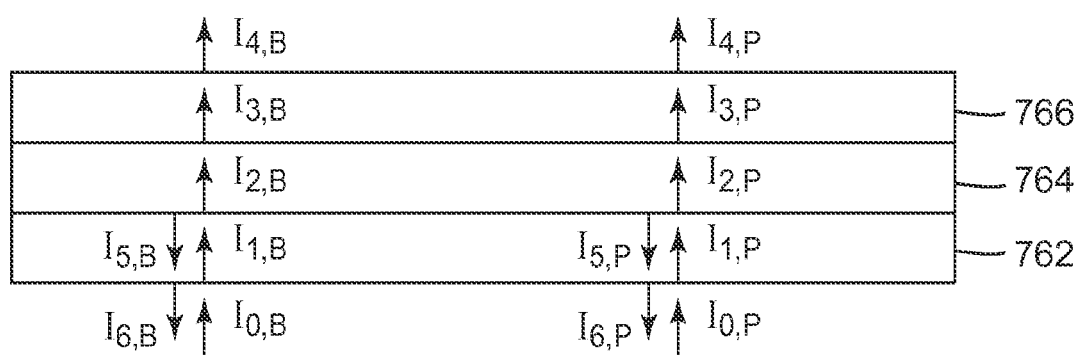
FIG. 7B is a schematic side view of another composite optical film adapted for bi-level internal patterning.

FIG. 7B is a schematic side view of another composite optical film 760 adapted for bi-level internal patterning. The film 760 may in some cases be identical to film 750 if the blocking layer 754 of film 750 is sufficiently rotationally asymmetric, e.g., if it is a reflective polarizer. In any case, the film 760 of FIG. 7B has, like film 750, been specifically designed to allow independent processing or patterning of at least two of its constituent optical films, i.e., it has been designed for bi-level internal patterning, similar to the films described in connection with FIG. 4A. Film 760 incorporates a blocking layer 764 that is substantially rotationally asymmetric, the blocking layer 764 preferably being a multilayer reflective polarizer having a block axis and a pass axis. Such a blocking layer allows a first beam of normally incident light of the write wavelength, of suitable intensity or fluence, and being substantially linearly polarized along the block axis of the blocking layer (this first beam being denoted in FIG. 7B by subscript "B" for "block axis" polarization), is used to treat or pattern a first optical film 762 (which may be the same as optical film 752 in FIG. 7A) without substantially treating or patterning a second optical film 766 (which may be the same as optical film 756 in FIG. 7A). The rotationally asymmetric blocking layer also allows a second beam of suitable fluence, the second beam also being normally incident and also comprising the write wavelength, but being polarized orthogonal to the first beam and preferably parallel to the pass axis of the blocking layer 764, (this second beam being denoted in FIG. 7B by subscript "P" for "pass axis" polarization), to treat or pattern the second film 766 without substantially treating or patterning the first film 762.

Referring still to FIG. 7B, the first film 762 (which may also be referred to as a "front" film, from the standpoint of the incident radiation used to treat or write the composite film) has lower and upper thresholds $I_{L,1}$ and $I_{U,1}$ while the second film 766 (which may be referred to as a "back" film for similar reasons) has lower and upper thresholds $I_{L,2}$ and $I_{U,2}$. The first and second films likewise absorb a fraction $\gamma_1$ and $\gamma_2$ of the energy transversing each packet, respectively. The polarization-sensitive blocking layer 764 passes a portion $\beta_B$ of light of the write wavelength impinging on it in the block polarization state, and passes a portion $\beta_P$ of light of the write wavelength impinging on it in the pass polarization state, where $\beta_P$ is greater than $\beta_B$. We assume for purposes of this description that blocking layer 764 is a reflective polarizer. Preferably, absorption in the blocking layer is negligible, such that the amount light of the write wavelength that is reflected is thus $1-\beta_B$ and $1-\beta_P$ for the block and pass states, respectively.

The various rays shown in FIG. 7B represent the intensity or fluence state of the two propagating writing beams at various points in their paths. The rays shown in the figure are meant to be illustrative only, since additional reflections from the various external and internal surfaces, beyond those shown in the figure, will also in general be present. Relationships described here are intended as a first approximation for discussion purposes. Beam $I_{1,B}$ is the residual of the first initial write wavelength beam, $I_{0,B}$, after the first reflection from the outer surface, i.e. $I_{1,B}$ is $(1-R) I_{0,B}$ where R is the fraction reflected off the outer surface. Beam $I_{2,B}$ is the residual unabsorbed portion of $I_{1,B}$ after traversing the first film 762. Thus, $I_{2,B}$ is the product $(1-\gamma_1) I_{1,B}$. The reflected beam $I_{5,B}$ from the blocking layer 764 is $(1-\beta_B) I_{2,B}$ which is reduced to $I_{6,B}$ after again reaching the front surface of the film 760. Thus $I_{6,B}$ is $(1-\gamma_1)(1-\beta_B) I_{2,B}$. With no absorption in the blocking layer, then $I_{3,B}$ entering the second film 766 is $R_B I_{2,B}$. Finally, the beam at the back of the second film, $I_{4,B}$, is then $(1-\gamma_2) \beta_B I_{2,B}$.

The second write wavelength beam, $I_{0,P}$, propagates through the composite film 760 in similar fashion to the first beam $I_{0,B}$, except of course the blocking layer 764 transmits the second beam more than the first beam due to the differences between $\beta_P$ and $\beta_B$. (Further, to the extent one or both of the writeable films 762, 766 may also be rotationally asymmetric, they too will transmit the different polarization states differently. For simplicity in this description, we assume the films 762, 766 are rotationally symmetric.) In order to fully write the first film 762 in the block polarization state (using the first beam), then the total fluence at any point is the sum of the forward traversing and backwards reflecting beam, e.g. $I_{2,B}+I_{5,B}$ and $I_{1,B}+I_{6,B}$ or similar quantities in the middle portions of the front film. Thus, these sums should be greater than $I_{U,1}$. Moreover, $I_{3,B}$ should be less than $I_{L,2}$. With regard to writing the second film 766 in the pass state (using the second beam, $I_{0,P}$), then for full and complete independent manipulation, $I_{2,P}+I_{5,P}$ and $I_{1,P}+I_{6,P}$ should be less than $I_{L,1}$, while $I_{4,P}$ should be more than $I_{U,2}$.

Still referring to composite film 760 of FIG. 7B, it also follows from the strength of the various block state terms, that to a first approximation:

$$(I_{L,2}/I_{U,1}) > \beta_B/(2-\beta_B)$$

in order to process the first or front film without disturbing the second or back film. As the block state becomes strong and $\beta_B$ approaches zero, this constraint becomes moot as the back is fully isolated from the block state impinging on the front. As the polarizer becomes ineffective and $\beta_B$ approaches unity, then $I_{L,2}$ should approach $I_{U,1}$ to provide independent processability. In this limit, however, the window of operation becomes negligible as the fluence must then be large enough to be greater than $I_{U,1}$ at the back of the front film while be small enough to be less than $I_{L,2}$ at the front of the back film.

It likewise follows from the strength of the various terms for the pass state terms, that to a first approximation:

$$(I_{U,2}/I_{L,1}) < \beta_P/(2-\beta_P)$$

in order to process the back film without disturbing the front film. As the pass state becomes perfectly transmissive and $\beta_P$ approaches unity, then the lower write threshold of the front film $I_{L,1}$ merely needs to exceed the upper write threshold $I_{U,2}$ of the back film. As the pass state becomes partially reflective, the lower write threshold for the front film should exceed the upper write threshold of the back film by a factor larger than unity, e.g. $(2-\beta_P)/\beta_P$. Finally, one should note that the write threshold of each patternable film is intimately connected to the absorptivity of that packet.

FIGS. 4A, 7A, and 7B each depict multilayer optical films having two writeable optical films. As discussed above, however, bi-level internal patterning can also encompass composite films that have three or more independently writeable optical films therein. In such cases more than one blocking layer, and three or more writable films, may be used. The additional blocking layer can be of the type that allows for double-sided irradiation treatment, or of the type that utilizes an angle-shifting reflection band for possible single-sided irradiation treatment. In one alternative embodiment to that of film 750 (see FIG. 7A), a second blocking layer (containing a reflective multilayer packet) is disposed atop the second writable film 756, and a third writable film is then disposed atop the second blocking layer. Thus, the second writable film 756 is now sandwiched between two blocking layers. The second blocking layer may have a reflection band that is broader than that of the first blocking layer 754, such that light incident from below at the oblique angle depicted in FIG. 7A is still sufficiently blocked by the second blocking layer so that the third film is not substantially modified or patterned at the oblique angle used to process the second film 756. The first two films 752, 756 of this alternative embodiment may thus be independently processed as depicted in FIG. 7A, while the third writeable film may be processed at a still higher oblique angle than that used for the second film. The third writable film may then have a still higher absorptivity than the second film, analogous to the relationship between the second and first films. Alternatively, the first two films 752, 756 may be processed as depicted in FIG. 7A, while the third film may be processed from the opposite side of the construction (i.e., using a beam incident from the top of FIG. 7A). Additional writable films and blocking layers can also be added. For example, a bi-level internally patternable composite film may comprise four independently writeable optical films by laminating together two films of the type shown in FIG. 7A with a third blocking layer sandwiched therebetween that substantially isolates the constituent films, whereupon the first film is processed with normally incident light from below, the second film is processed with obliquely incident light from below, a third film is processed with normally incident light from above, and a fourth film is processed with obliquely incident light from above.

In some embodiments, three writeable films within a bi-level patternable composite film can be independently written or treated with the same write wavelength processed from the same side of the film. One film construction compatible with such processing utilizes a polarizing (rotationally asymmetric) blocking layer between one pair of the patternable films, and a band-shifting blocking layer between another pair of the films. One such composite film construction begins with the film 430 of FIG. 4A in which the blocking layer 416b is a reflective polarizer, so that a (high fluence) first normally incident beam linearly polarized along the block axis of the blocking layer can treat or write the first or front film 416a, and a (lower fluence) second normally incident beam linearly polarized along the pass axis of the blocking layer can treat or write the second film 416c. A second blocking layer, which provides a reflection band that shifts with incidence angle (referred to herein as a band-shifting blocking layer) is then added to this composite film, and placed underneath the second film 416c. Such second blocking layer may be or comprise a suitably designed packet of microlayers. A third writable film, in addition to the two other writeable films (416a and 416b) is then placed underneath the second film. (The three writeable films may, if desired, all incorporate the same wavelength-selective absorber, but in differing concentrations to provide different write thresholds for the films.) With this new composite film construction, the previous back writable film 416c is now sandwiched between two blocking layers. The front (416a) and now middle (416c) films can be processed as before using the first and second normally incident beams of the same write wavelength but different polarization. The second blocking layer (the band-shifting blocking layer) of this embodiment is preferably designed to sufficiently block both polarization states at normal incidence so that the third, or back, film is unaffected by the first and second beams. This third film is designed to have a lower write threshold than either of films 416a or 416c, and is processed with a third directed beam (which preferably comprises the same write wavelength as the first and second beams) at a sufficiently oblique angle to shift the reflection band of the second blocking layer away from the write wavelength, such that the second blocking layer highly transmits the third beam. If the reflection band of the (polarizing) blocking layer 458 also sufficiently shifts at the oblique angle, then the blocking layer 458 may be highly transmissive for any polarization state, in which case the third directed beam may be either polarized or unpolarized, as desired.

In an alternative approach to that just described in the preceding paragraph, a second blocking layer and a third writable film are again placed beneath the second writable film (416c) of FIG. 4A. The first two films (416a and 416c) are processed using the first and second normally incident beams of the same write wavelength but different polarization. The third film may be processed with a third directed beam (which preferably comprises the same write wavelength as the first and second beams) that is incident from the opposite side of the composite film compared to the first and second beams, i.e., from the bottom rather from the top of the figure. Further embodiments are contemplated by the addition of one or more additional writable film and blocking layer. For example, two composite films of the type shown in FIG. 7a can be combined for treatment from opposite sides, with a third blocking layer disposed between such films to isolate the treatment effects from opposite sides. Still further combinations and variations of the disclosed bi-level patternable films are also contemplated.

Figure 8A:
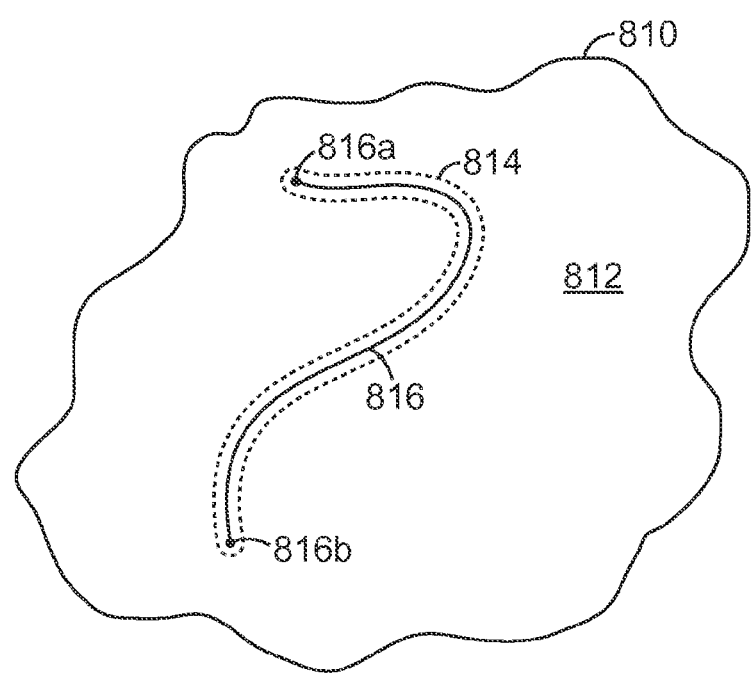
FIGS. 8A-C are schematic top views of different second zones of an internally patterned composite optical film, and superimposed thereon possible paths of a light beam relative to the film capable of forming the depicted zones.
Figure 8B:
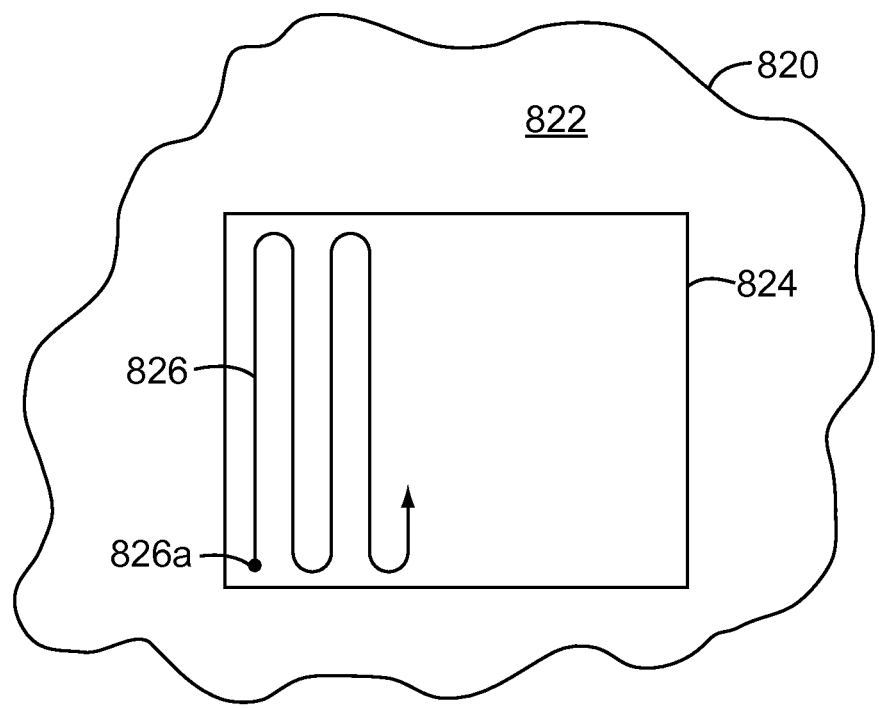
Figure 8C:
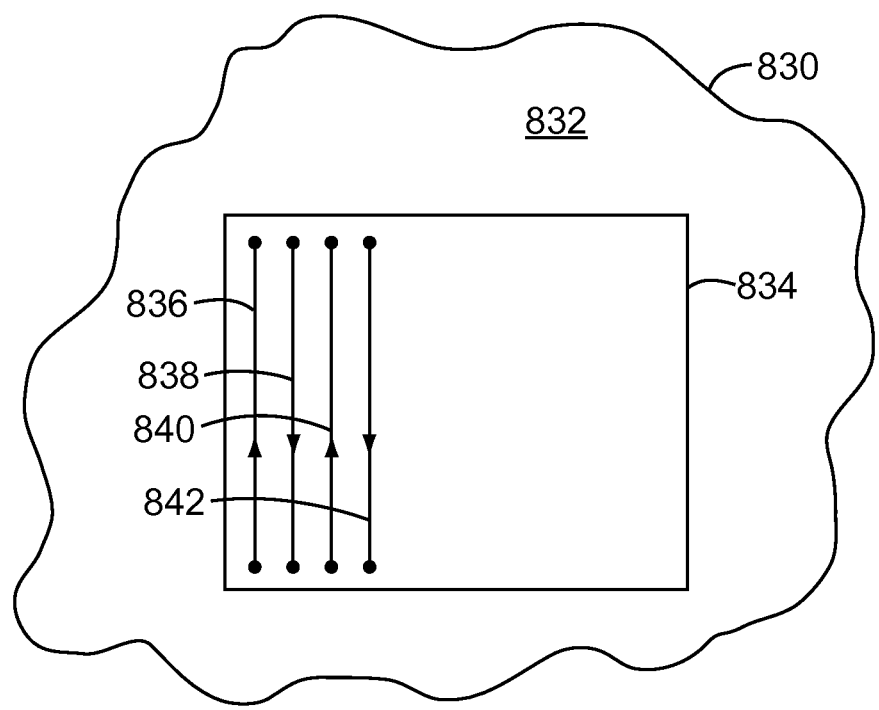

FIGS. 8A-C provide schematic top views of different second zones of a patterned composite film, and superimposed thereon possible paths of a directed light beam relative to the film capable of forming the depicted zones. In FIG. 8A, a light beam is directed at a patternable composite film 810 and scanned at a controlled speed from a starting point 816a to an ending point 816b along a path 816 to selectively heat the film in an arbitrarily-shaped zone 814 to distinguish it from a first zone 812. FIGS. 8B and 8C are similar. In FIG. 8B, a light beam is directed at a patternable composite film 820 and scanned at a controlled speed from a starting point 826a along a path 826 to selectively heat the film in a rectangular-shaped zone 824 to distinguish it from a neighboring first zone 822.

In FIG. 8C, a light beam is directed at a patternable composite film 830 and scanned at controlled speeds along the discontinuous paths 836-842, and so on, to selectively heat the film in a rectangular-shaped zone 834 to distinguish it from a neighboring first zone 832. In each of FIGS. 8A-C, the heating is sufficient to reduce or eliminate birefringence of at least some interior layers or materials in the second zone while maintaining the birefringence of those layers or materials in the first zone, and is accomplished while maintaining the structural integrity of the layers or films in the second zone and without any selective application of pressure to the second zone.

The directed light beam may also be modulated to create paths that are dashed, dotted, or otherwise broken or discontinuous. The modulation may be complete, wherein the light beam intensity changes from 100% or "full on" to 0% or "full off". Alternatively, the modulation may be partial. Further, the modulation may include abrupt (e.g. stepwise) changes in beam intensity, and/or it may include more gradual changes in beam intensity.

Figure 9A:
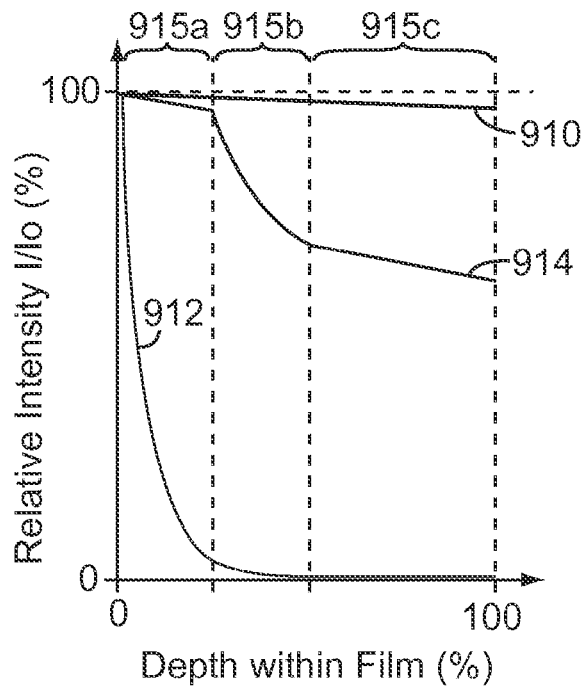
FIG. 9A is an idealized plot showing the relative intensity of a beam of light as a function of the depth as the light beam propagates into the film, with three curves provided for three different optical films.
Figure 9B:
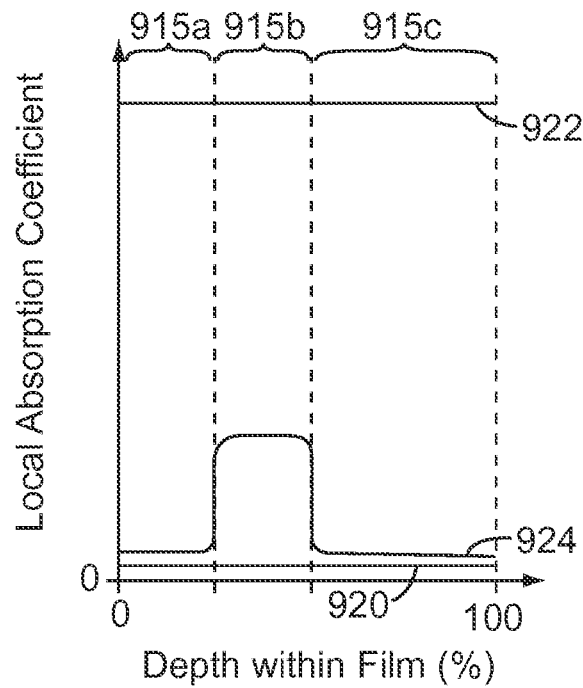
FIG. 9B is an idealized plot showing a local absorption coefficient as a function of the depth or axial position within the film, with three curves corresponding to the three curves of FIG. 9A.

FIGS. 9A and 9B address the topic of how the absorption of the patternable film can or should be tailored to provide optimal localized heating. The graphs of FIGS. 9A and 9B are plotted on the same horizontal scale, which represents the depth or position of the radiant light beam as it propagates through the film. A depth of 0% corresponds to the front surface of the film, and a depth of 100% corresponds to the rear surface of the film. FIG. 9A plots along the vertical axis the relative intensity $I/I_0$ of the radiant beam. FIG. 9B plots the local absorption coefficient (at the selected wavelength or wavelength band of the radiant beam) at each depth within the film.

Three curves are plotted in each figure, for three patternable optical film embodiments. In a first embodiment, the film has a substantially uniform and low absorption throughout its thickness at the wavelength of the directed light beam. This embodiment is plotted as curve 910 in FIG. 9A and curve 920 in FIG. 9B. In a second embodiment, the film has a substantially uniform and high absorption throughout its thickness. This embodiment is plotted as curve 912 in FIG. 9A and curve 922 in FIG. 9B. In a third embodiment, the film has a relatively low absorption throughout regions 915a and 915c of its thickness, but has a higher, intermediate absorption in region 915b of its thickness.

The first embodiment has an absorption coefficient that is too low for many situations. Although the directed light beam is absorbed uniformly as a function of depth as indicated by the constant slope of the curve 910, which may be desirable in some cases, very little of the light is actually absorbed as shown by the high value of the curve 910 at a depth of 100%, meaning that a high percentage of the directed light beam is wasted. Nevertheless, in some cases this first embodiment may still be quite useful in the treatment of some films. The second embodiment has an absorption coefficient that is too high for many situations. Although substantially all of the directed light beam is absorbed, and none is wasted, the high absorption causes an excessive amount of light to be absorbed at the front surface of the film, which may cause surface damage to the film. If the absorption is too high, an adequate amount of heat cannot be delivered to interior layers or materials of interest without damaging layers at or near the front surface of the film. The third embodiment utilizes a non-uniform absorption profile that may be achieved, for example, by incorporating an absorbing agent into selected interior layers of the film. The level of absorptivity (controlled by the local absorption coefficient) is desirably set to an intermediate level so that an adequate portion of the directed light beam is absorbed in the tailored absorbing region 915b of the film, but the absorptivity is not so high that an excessive amount of heat is delivered to the incident end of the region 915b relative to the opposite end. In many instances, the absorptivity in absorbing region 915b is still reasonably weak, e.g. the relative intensity profile 914 over that region may appear more as a straight line with merely a steeper slope than the other regions, e.g. 915a and 915c. The adequacy of the absorption may be determined by balancing that absorptivity against the power and duration of the incoming directed light beam to achieve the desired effect.

In an elementary example of the third embodiment, the patternable film may have a construction of two thick skin layers with one or more packets of microlayers therebetween (separated by protective boundary layers if two or more microlayer packets are included), and the film may be composed of only two polymer materials A and B. An absorbing agent is incorporated into polymer material A to increase its absorptivity to a moderate level but no absorbing agent is incorporated into polymer B. Both materials A and B are provided in alternating layers of the microlayer packet(s), but the skin layers and the protective boundary layers, if present, are composed only of polymer B. Such a construction will have a low absorptivity at the outer surfaces, i.e. the skin layers, of the film, due to the use of the weakly absorbing material B, and will also have a low absorptivity at the optically thick PBLs if they are present. The construction will have a higher absorptivity in the microlayer packet(s) due to the use of the more strongly absorbing material A in alternating microlayers (along with alternating microlayers of the more weakly absorbing material B). Such an arrangement can be used to preferentially deliver heat to interior layers of the film, e.g. to one or more interior microlayer packet(s), rather than to outer surface layers. Note that with an appropriately designed feedblock the multilayer optical film can comprise three or more different types of polymer materials (A, B, C, . . . ), and an absorptive agent may be incorporated into one, some, or all of the materials in order to provide a wide variety of different absorption profiles so as to deliver heat to selected interior layers, packets, or regions of the film. In other cases, it may be useful to include an absorbing agent in the PBL(s) or even in the skin layer, if present. In either case, the loading or concentration may be same or different, either higher or lower, than in the microlayers.

Similar absorption profiles as those of the foregoing embodiments may be obtained using the inherent absorption characteristics of the various native materials used in the multilayer optical film. Thus, a given composite film construction may comprise different materials having different absorption characteristics among the various constituent layers or films of the composite film, and those various layers or films may have been formed together during film formation (e.g. by coextrusion), or may have been formed as separate precursor films which were later combined e.g. by lamination.

The STOF films and articles may thus be used in a wide variety of displays and other extended area optoelectronic devices, such as backlights, signs, luminaires, channel letters, light guiding or light piping systems, and the like. Such devices may emit polarized or unpolarized light. Such devices may emit white light, i.e., light perceived by an ordinary observer as nominally white, or light of a particular color other than white. Such devices may comprise arrays of liquid crystals, organic light emitting devices (OLEDs), and/or light emitting diodes (LEDs), for example. Such devices may be or comprise a 3-dimensional display, e.g., a stereoscopic display. Such devices may be or comprise transmissive displays, reflective displays, and/or transflective displays. Such devices may include edge-lit displays and/or direct-lit displays.

The films, methods, and business processes disclosed herein may be generally useful in any application in which a spatially controlled level of orientation is desired. Fields of interest may include, for example, display, decorative, and security applications. Some applications may overlap multiple fields. For example, some articles may incorporate the internally patterned films disclosed herein in combination with a film, substrate, or other layer that includes conventional patterning in the form of indicia, for example. The resulting article may be useful in security applications, but versions of it may also be considered decorative. Selectively heat treating such an article may produce zones in the internally patterned film that selectively obstruct (by increasing reflectivity) or reveal (by decreasing reflectivity) portions of the conventional patterning of the other film, depending on the design of the internally patterned film.

Further in regard to security applications, the disclosed films may be used in a variety of security constructions including identification cards, driver's licenses, passports, access control passes, financial transaction cards (credit, debit, pre-pay, or other), brand protection or identification labels, and the like. The film may be laminated or otherwise adhered as interior or exterior layers to other layers or portions of the security construction. When the film is included as a patch, it may cover only a portion of the major surface of the card, page, or label. In some cases, it may be possible to use the film as the base substrate or the only element of the security construction. The film may be included as one of many features in the security construction such as holograms, printed images (intaglio, offset, barcode, etc.), retroreflective features, UV or IR activated images and the like. In some instances, the disclosed films may be layered in combination with these other security features. The film may be used to provide a personalizable feature to the security construction, for example, a signature, an image, an individual coded number, etc. The personalizable feature may be in reference to the individual document holder or a specific product entity, such as in the case of a manufacturer tag, a lot verification tag, a tamper-proof coding, or the like. The personalizable feature can be made with a variety of scanning patterns including lines and dot patterns. Patterns can be the same or different among writable layers, depending on the film construction.

The disclosed films may provide both overt (e.g. clearly visible to an ordinary observer) and covert security features to the security construction. For example, a writable composite retarder film may provide a covert feature viewable with a polarizing analyzer, e.g. a feature that becomes apparent or disappears depending on the polarization state of the analyzer.

Additional useful articles that can be made using the disclosed patternable films include a wide variety of identification documents (ID documents). The term "ID documents" is broadly defined and is intended to include, but not be limited to, passports, driver's licenses, national ID cards, social security cards, voter registration and/or identification cards, birth certificates, police ID cards, border crossing cards, security clearance badges, security cards, visas, immigration documentation and cards, gun permits, membership cards, phone cards, stored value cards, employee badges, debit cards, credit cards, and gift certificates and cards. ID documents are also sometimes referred to as "security documents". The articles of this disclosure may be the ID document or may be part of the ID document. Other useful articles that may be made using the disclosed patternable films include articles containing color images and items of value, such as, for example, currency, bank notes, checks, and stock certificates, where authenticity of the item is important to protect against counterfeiting or fraud, as well as articles that can be used to produce informative, decorative, or recognizable marks or indicia on product tags, product packaging, labels, charts, maps, and the like.

Still more useful articles that can utilize the disclosed patternable films include passports, ID badges, event passes, affinity cards, product identification formats and advertising promotions for verification and authenticity, brand enhancement images, identification presentation images in graphics applications such as emblems for police, fire, or other emergency vehicles; information presentation images in graphics applications such as kiosks, night signs, and automotive dashboard displays; and novelty enhancement through the use of composite images on products such as business cards, hangtags, art, shoes, and bottled products.

Finally, it should be noted that many of the features described here for security applications are likewise useful for decorative applications. For example, a personalized logo can be thus embedded in a consumer article.

The teachings of this application can be used in combination with the teachings of any or all of the following commonly assigned applications, which are incorporated herein by reference: PCT Publication WO 2010/075357 (Merrill et al.), "Internally Patterned Multilayer Optical Films Using Spatially Selective Birefringence Reduction"; PCT Publication WO 2010/075340 (Merrill et al.), "Multilayer Optical Films Having Side-by-Side Mirror/Polarizer Zones"; PCT Publication WO 2010/075373 (Merrill et al.), "Multilayer Optical Films Suitable for Bi-Level Internal Patterning"; PCT Publication WO 2010/075363 (Merrill et al.), "Internally Patterned Multilayer Optical Films With Multiple Birefringent Layers"; and PCT Publication WO 2010/075383 (Merrill et al.), "Multilayer Optical Films Having Side-by-Side Polarizer/Polarizer Zones"; and the following applications filed on Jun. 30, 2010: U.S. Application Ser. No. 61/360,124, "Diffuse Reflective Optical Films With Spatially Selective Birefringence Reduction"; U.S. Application Ser. No. 61/360,129, "Mask Processing Using Films With Spatially Selective Birefringence Reduction"; U.S. Application Ser. No. 61/360,022, "Multi-Layer Articles Capable of Forming Color Images and Methods of Forming Color Images"; and U.S. Application Ser. No. 61/360,032, "Multi-Layer Articles Capable of Forming Color Images and Methods of Forming Color Images".

In many cases, a material layer or phase will exhibit birefringence as a result of the molecular makeup of the material. In some cases, however, a medium (sometimes referred to as an effective medium) may exhibit birefringence as a result of microscopic structures that have a dimension that is small compared to the wavelength of light but large compared to molecular distances. An elementary example of such a medium is a stack of ultrathin layers of different light-transmissive materials. See e.g. U.S. Pat. No. 6,590,707 (Weber). An effective medium of birefringent material may thus be or comprise a stack of ultrathin layers e.g. of alternating polymer materials, for example, where the optical thickness of each of the layers is less than ¼, and preferably less than ⅛, of a wave thick (e.g., less than 150, or 100, or 50 nm thick). Such media may in general be used in the disclosed embodiments.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A composite retarder film having a first and second, generally opposed sides, comprising:
   a first film providing a first light retardation, the first film also having a first absorption characteristic suitable to, upon exposure to a first light beam comprising a write wavelength, absorptively heat the first film by an amount sufficient to change the first light retardation to a third light retardation while maintaining a structural integrity of the first film without changing a second retardation of a second film;
   the second film providing the second light retardation, the second film also having a second absorption characteristic suitable to, upon exposure to a second light beam comprising the write wavelength, absorptively heat the second film by an amount sufficient to change the second light retardation to a fourth light retardation while maintaining a structural integrity of the second film without changing the first retardation of the first film; and
   a first blocking layer disposed between the first and second film, the first blocking layer being adapted to at least partially block light of the write wavelength,
   wherein the first and second light beams are incident on the same side of the composite.

2. The film of claim 1, wherein the first and second light retardations are substantially the same.

3. The film of claim 1, wherein the first and second light retardations are substantially different.

4. The film of claim 3, wherein the first light retardation is a half-wave retardation, and the second light retardation is a quarter-wave retardation.

5. The film of claim 1, wherein the third light retardation is less than the first light retardation, and the fourth light retardation is less than the second light retardation.

6. The film of claim 1, wherein the first film has a first fast axis, the second film has a second fast axis, and the first and second fast axes are substantially parallel.

7. The film of claim 1, wherein the first and second films are interior layers of the composite film.

8. The film of claim 1, further comprising:
a third film providing a fifth light retardation, the third film also having a third absorption characteristic suitable to, upon exposure to a third light beam comprising the write wavelength, absorptively heat the third film by an amount sufficient to change the fifth light retardation to a sixth light retardation while maintaining a structural integrity of the third film without changing the first retardation of the first film and the second retardation of the second film; and
a second blocking layer disposed between the third film and at least one of the first and second films,
wherein the first, second, and third light beams are incident on the same side of the composite.

9. The film of claim 1, wherein the first blocking layer comprises a reflective STOF film.

10. A composite film, comprising:
a retarder film providing a first light retardation; and
an optical film connected to the retarder film such that at least some light transmitted by the retarder film impinges upon the optical film, the optical film providing a first reflective characteristic;
wherein the retarder film has a first absorption characteristic suitable to, upon exposure to a first light beam, absorptively heat the retarder film by an amount sufficient to change the first light retardation to a second light retardation without changing the first reflective characteristic of the optical film and while maintaining a structural integrity of the retarder film; and
wherein the optical film has a second absorption characteristic suitable to, upon exposure to a second light beam, absorptively heat the optical film by an amount sufficient to change the first reflective characteristic to a second reflective characteristic without changing the first light retardation of the retarder film,
wherein the first and second light beams are incident on the same side of the composite.

11. The film of claim 10, wherein the second absorption characteristic is suitable to, upon exposure to the second light beam, absorptively heat the optical film by an amount sufficient to change the first reflective characteristic to the second reflective characteristic while maintaining a structural integrity of the optical film.

12. The film of claim 10, wherein the optical film comprises a first group of microlayers arranged to selectively reflect light by constructive or destructive interference to provide the first reflective characteristic.

13. The film of claim 12, wherein the first group of microlayers is interior to the composite film.

14. The film of claim 10, wherein the optical film comprises a blended layer having at least a first and second material arranged in distinct first and second phases in the blended layer.

15. The film of claim 14, wherein at least one of the first and second phases is a continuous phase and is birefringent.

16. The film of claim 10, wherein the optical film and the retarder film are components of a coextruded polymeric film.

17. The film of claim 16, wherein the retarder film is an interior layer of the coextruded polymeric film.

18. A method of making a patterned retarder film, comprising:
providing a composite retarder film that includes a first film providing a first light retardation and a second film providing a second light retardation, the second film being disposed such that at least some light transmitted by the first film impinges upon the second film;
directing a first beam of light at the composite retarder film to selectively heat the first film in order to change the first light retardation to a third light retardation without substantially changing the second light retardation; and
directing a second beam of light at the composite retarder film to selectively heat the second film in order to change the second light retardation to a fourth light retardation without substantially changing the first light retardation,
wherein the first beam of light comprises a write wavelength and the second beam of light also comprises the write wavelength, and wherein the composite retarder film includes a blocking layer that at least partially blocks light of the write wavelength,
wherein the first and second light beams are incident on the same side of the composite.

19. The method of claim 18, wherein directing the first beam at the composite retarder film selectively heats the first film in a first zone to cause the first light retardation to change to the third light retardation in the first zone, and wherein directing the second beam at the composite retarder film selectively heats the second film in a second zone different from the first zone to cause the second light retardation to change to the fourth light retardation in the second zone.

20. The method of claim 19, wherein the first and second zones partially overlap such that the film exhibits different first, second, and third film retardations in different portions of the first and second zones.

21. The method of claim 18, wherein the first beam of light comprises a write wavelength and the second beam of light also comprises the write wavelength, and wherein the composite retarder film includes a blocking layer that at least partially blocks light of the write wavelength.

22. The method of claim 21, wherein the blocking layer comprises a STOF film.

23. The method of claim 18, wherein the first and second light retardations are substantially the same.

24. The method of claim 18, wherein the first and second light retardations are substantially different.

25. The method of claim 18, wherein the first light retardation is a half-wave retardation, and the second light retardation is a quarter-wave retardation.

26. The method of claim 18, wherein the third light retardation is less than the first light retardation, and the fourth light retardation is less than the second light retardation.

27. The method of claim 18, wherein at least one of the third and fourth light retardations is a substantially zero retardation.

28. A method of making a patterned film, comprising:
providing a composite film that includes an optical film and a retarder film disposed such that at least some light transmitted by the retarder film impinges upon the optical film, the optical film providing a first reflective characteristic, and the retarder film providing a first light retardation;
directing a first beam of light at the composite film to change the first reflective characteristic to a different second reflective characteristic in a first zone without substantially changing the first light retardation in the first zone; and
directing a second beam of light at the film to change the first light retardation to a different second light retardation in a second zone without substantially changing the first reflective characteristic in the second zone,
wherein the first and second light beams are incident on the same side of the composite.

29. The method of claim 28, wherein providing the composite film comprises coextruding a first and second polymer material.

30. The method of claim 28, wherein the optical film comprises a first group of microlayers arranged to selectively reflect light by constructive or destructive interference to provide the first reflective characteristic.

31. The method of claim 28, wherein the retarder film is an interior layer of the composite film.

32. The method of claim 28, wherein the optical film comprises a blended layer having at least a first and second material arranged in distinct first and second phases in the blended layer, and wherein the first reflective characteristic is a first diffusely reflective characteristic.

33. The method of claim 22, further comprising:
   directing a third beam of light at the composite retarder film to substantially remove a contribution of the blocking layer to a retardation of the composite film.

\* \* \* \* \*

UNITED STATES PATENT AND TRADEMARK OFFICE
CERTIFICATE OF CORRECTION

PATENT NO. : 9,097,858 B2
APPLICATION NO. : 13/703556
DATED : August 4, 2015
INVENTOR(S) : Merrill It is certified that error appears in the above-identified patent and that said Letters Patent is hereby corrected as shown below:

In the Specification

Column 7
Line 33, Delete "61/360,124," and insert -- 61/360,124 (Attorney Docket No. 66469US002), --, therefor.

Column 25
Line 18, Delete "61/360,124," and insert -- 61/360,124 (Attorney Docket No. 66469US002), --, therefor.

Column 26
Line 66, Delete "61/360,124," and insert -- 61/360,124 (Attorney Docket No. 66469US002), --, therefor.

Column 43
Line 63, Delete "61/360,124," and insert -- 61/360,124 (Attorney Docket No. 66469US002), --, therefor.

Column 53
Line 38, Delete "61/360,124," and insert -- 61/360,124 (Attorney Docket No. 66469US002), --, therefor.
Line 40, Delete "61/360,129," and insert -- 61/360,129 (Attorney Docket No. 66474US002), --, therefor.
Line 42, Delete "61/360,022," and insert -- 61/360,022 (Attorney Docket No. 66267US002), --, therefor.
Line 45, Delete "61/360,032," and insert -- 61/360,032 (Attorney Docket No. 66498US002), --, therefor.

Signed and Sealed this
Eighth Day of March, 2016

Michelle K. Lee
*Director of the United States Patent and Trademark Office*